US011849432B2

(12) United States Patent
Uzawa et al.

(10) Patent No.: US 11,849,432 B2
(45) Date of Patent: Dec. 19, 2023

(54) BANDWIDTH ALLOCATION APPARATUS, BANDWIDTH ALLOCATION METHOD, AND BANDWIDTH ALLOCATION PROGRAM

(71) Applicant: NIPPON TELEGRAPH AND TELEPHONE CORPORATION, Tokyo (JP)

(72) Inventors: Hiroyuki Uzawa, Tokyo (JP); Hirotaka Ujikawa, Tokyo (JP); Hirotaka Nakamura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 370 days.

(21) Appl. No.: 17/269,211

(22) PCT Filed: Aug. 16, 2019

(86) PCT No.: PCT/JP2019/032107
§ 371 (c)(1),
(2) Date: Feb. 17, 2021

(87) PCT Pub. No.: WO2020/040047
PCT Pub. Date: Feb. 27, 2020

(65) Prior Publication Data
US 2022/0417914 A1     Dec. 29, 2022

(30) Foreign Application Priority Data
Aug. 22, 2018  (JP) .................................. 2018-155620

(51) Int. Cl.
*H04W 72/04*  (2023.01)
*H04W 72/12*  (2023.01)
(Continued)

(52) U.S. Cl.
CPC ......... *H04W 72/044* (2013.01); *H04W 28/20* (2013.01); *H04W 72/12* (2013.01)

(58) Field of Classification Search
None
See application file for complete search history.

(56) References Cited

U.S. PATENT DOCUMENTS

2016/0270018 A1* 9/2016 He ..................... H04L 1/0003
2016/0270118 A1* 9/2016 He ..................... H04W 74/06
(Continued)

OTHER PUBLICATIONS

Takehiro Nakamura, "Toward 5G Introduction in 2020", [online], 5G Deployment toward 2020 and Beyond, MPLS Japan 2016; [searched on Jul. 27, 2018], Internet <https://www.mpls.jp/2016/presentations/20161107_MPLS-Japan2016_docomo_Nakamura.pdf>.

(Continued)

*Primary Examiner* — Sai Aung
(74) *Attorney, Agent, or Firm* — Harness, Dickey & Pierce, P.L.C.

(57) ABSTRACT

A bandwidth allocation apparatus includes an acquisition unit acquiring scheduling information related to transmission of uplink data from a first subscriber line termination apparatus corresponding to a subscriber line termination apparatus needing to transfer uplink data with low latency, a requested amount reception unit receiving, from second subscriber line termination apparatus corresponding to a subscriber line termination apparatus not needing to transfer uplink data with low latency, information representing a requested amount related to transmission of uplink data from the second subscriber line termination apparatus, in a requested amount reception cycle corresponding to a cycle equal to or longer than a predetermined maximum round-trip time, and an allocation unit allocating, in an allocation amount determination cycle shorter than the requested (Continued)

amount reception cycle, a bandwidth to the uplink data from the first subscriber line termination apparatus on a basis of the scheduling information, and allocating, in the allocation amount determination cycle, a bandwidth to the uplink data from the second subscriber line termination apparatus on a basis of the information representing the requested amount.

8 Claims, 23 Drawing Sheets

(51) Int. Cl.
  *H04W 72/044* (2023.01)
  *H04W 28/20* (2009.01)

(56) References Cited

U.S. PATENT DOCUMENTS

| | | | |
|---|---|---|---|
| 2017/0171853 A1* | 6/2017 | Lindoff | H04W 72/0473 |
| 2019/0268104 A1* | 8/2019 | Zou | H04L 1/1887 |
| 2020/0015251 A1* | 1/2020 | Takeda | H04W 72/23 |

OTHER PUBLICATIONS

H. Uzawa et al., "Practical Mobile-DBA Scheme Considering Data Arrival Period for 5G Mobile Fronthaul with TDM-PON", 2017 European Conference on Optical Communication (ECOC) Sep. 17-21, 2017.

D. Hisano et al., "TDM-PON for Accommodating TDD-Based Fronthaul and Secondary Services", Journal of lightwave technology, vol. 35, No. 14, Jul. 15, 2017.

Y. Luo et al., "Bandwidth Allocation for Multiservice Access on EPONs", IEEE Optical Communications, Feb. 2005.

H. Ou et al., "Integrated Dynamic Bandwidth Allocation for Low Buffer Aggregated Passive Optical Network Systems", Journal of optical communication network, vol. 7, No. 8, Aug. 2015.

NTT, "Basic Technology Course [GE-PON Technology], 3rd Session, DBA Function", NTT Technology Journal, Oct. 2005.

Nomura H et al., Bandwidth allocation of co-existing HLS/LLS base stations for TDM-PON system in 5G-MFH, IEICE Technical Report CS2019-4 (Apr. 2019), pp. 19-24.

* cited by examiner

BANDWIDTH ALLOCATION APPARATUS, BANDWIDTH ALLOCATION METHOD, AND BANDWIDTH ALLOCATION PROGRAM

CROSS-REFERENCE TO RELATED APPLICATIONS

This application is a 371 U.S. National Phase of International Application No. PCT/JP2019/032107 filed on Aug. 16, 2019, which claims priority to Japanese Application No. 2018-155620 filed on Aug. 22, 2018. The entire disclosures of the above applications are incorporated herein by reference.

TECHNICAL FIELD

The present invention relates to a bandwidth allocation apparatus, a bandwidth allocation method, and a bandwidth allocation program.

BACKGROUND ART

In a mobile wireless communication system (mobile system), functions of a base station may be split into upper layer side functions and lower layer side functions. An upper level apparatus is an apparatus (central unit) that is centrally arranged and that performs the upper layer side functions of the base station. Lower level apparatuses are apparatuses (distributed units) that are distributively arranged and that perform the lower layer side functions of the base station.

The upper and lower level apparatuses are connected by optical fibers. The area between the upper level apparatus and the lower level apparatus is referred to as a mobile fronthaul (MFH). Hereinafter, a section where the functions of the base station are split between the upper level apparatus and the lower level apparatus is referred to as a "functional split point". For the functional split point, for example, low layer split (LLS) including a split point inside a physical layer and high layer split (HLS) including a split point in a layer higher than the physical layer have been under study.

A latency requirement for the MFH varies depending on the functional split point. For LLS, the latency requirement for the MFH is 250 us each way. For HLS, the latency requirement for the MFH is 1.5 to 10 ms (see Non Patent Document 1).

For the MFH, application of a Time Division Multiplexing-Passive Optical Network (TDM-PON) system represented by a Next Generation-Passive Optical Network 2 (NG-PON2) has been under study (see Non Patent Document 2).

In the TDM-PON, an optical line terminal (OLT, subscriber line terminal station device) is connected to a plurality of optical network units (ONUs, subscriber line termination apparatus). The OLT communicates with the ONUs on the basis of time division multiplexing (TDM). Hereinafter, the direction from each of the ONUs to the OLT is referred to as "uplink". For transmission of uplink data (hereinafter referred to as "uplink transmission"), uplink transmission from each ONU is controlled by the OLT to prevent uplink optical signals between ONUs from being collided with each other. The ONU stores the uplink data in a buffer of the ONU, makes the buffer wait for uplink transmission, and transmits the data in accordance with an instruction from the OLT.

In a case where the TDM-PON is applied to the MFH, the lower level apparatuses are connected to the ONUs. The upper level apparatus is connected to the OLT.

Non Patent Document 2 discloses a dynamic bandwidth allocation (hereinafter referred to as "cooperative DBA") method for uplink transmission in the TDM-PON, the method being executed in cooperation with scheduling processing in the upper level apparatus in order to satisfy the LLS latency requirement when the lower level apparatuses for LLS are accommodated in the TDM-PON.

For LLS, in order that the upper level apparatus centrally controls uplink transmission from user terminals wirelessly connected to the lower level apparatus, the upper level apparatus performs scheduling at each radio transmission time interval (TTI). The upper level apparatus transmits results of the scheduling to the user terminals via the ONUs and the lower level apparatus. Each user terminal performs the uplink transmission on the basis of the scheduling results.

Hereinafter, the uplink data received from each user terminal by the lower level apparatus is referred to as "mobile data", and the time at which the lower level apparatus receives mobile data from each user terminal is referred to as an "uplink data reception time". Of the above-described scheduling results, information including information specifying the amount of uplink data and an uplink data reception time for the lower level apparatus for LLS is referred to as "scheduling information".

In the method of Non Patent Document 2, the OLT receives in advance, the scheduling information from the upper level apparatus. The OLT determines an allocation amount for each ONU on the basis of the scheduling information received in advance, and notifies the ONU of the allocation amount. This enables allocation in time for arrival at the ONU of the uplink data from the lower level apparatus, and thus allows the uplink data to be transferred with low latency.

On the other hand, for HLS, the above-described scheduling processing is performed by the lower level apparatus. Thus, the OLT is prevented from receiving the scheduling information from the upper level apparatus, and thus fails to perform the cooperative DBA. As a method for controlling the uplink transmission by the OLT without using the scheduling information, a bandwidth allocation method for periodically allocating a bandwidth for a fixed amount of data to each ONU (FBA: Fixed Bandwidth Allocation) has been disclosed (see Non Patent Documents 3 and 4). Since the OLT allocates the bandwidth for the fixed amount of data to each ONU regardless of whether the uplink data from each user terminal arrives at the ONU, the number of ONUs that can be accommodated in the OLT is limited.

As the uplink transmission control used in a case where the lower level apparatus for HLS is accommodated in the TDM-PON, a dynamic bandwidth allocation method based on a status-report scheme (hereinafter referred to as "SR-DBA") is applicable (see Non Patent Documents 5 and 6). SR-DBA is a bandwidth allocation method that is widely employed in fiber to the home (FTTH) and the like.

In this method, the OLT periodically allocates each ONU with a bandwidth by which the amount of data accumulated in the buffer is notified to the OLT (the requested amount for uplink transmission), and collects, from each ONU, information representing the requested amount. On the basis of the information representing the requested amount, the OLT determines allocation amount information including information regarding the start time of the uplink transmission and information regarding the amount of data permitted to be transmitted, and notifies each ONU of the determined allocation amount. Each ONU transmits, to the OLT, the uplink data accumulated in the buffer of the ONU on the basis of the notified information regarding the allocation amount.

In this control, a time equal to or longer than the maximum round trip time (RTT) (hereinafter referred to as the "maximum RTT") between the OLT and the ONU is required for the OLT to collect, from each ONU, information representing the requested amount. In a case where the maximum acceptable distance between the OLT and the ONU is for example 20 km, the maximum RTT is 200 µs, for example. For the OLT to determine and notify the allocation amount, the information representing the requested amount needs to be collected from each of the ONUS. Thus, a time period from the time when the ONU transmits the information representing the requested amount until the time to transmit the uplink data accumulated in the buffer of the ONU is reached is equal to or longer than the maximum RTT. Furthermore, as a result of consideration of a propagation delay time (=RTT/2), the time required to complete the transmission of the uplink data, and the latency for uplink transmission from the other ONUS, the latency applied to the uplink data from the lower level apparatus for HLS by TDM-PON is approximately 1 ms to 2 ms in total. Thus, SR-DBA is bandwidth allocation processing that is not suitable for applications that do not accept latency of approximately several ms. However, SD-DBA is allocation for the data accumulated in the buffer of the ONU, and thus has high bandwidth utilization efficiency and enables an increase in the number of ONUS that can be accommodated. HLS accepts latency ranging from 1.5 ms to 10 ms, and thus SR-DBA is applicable to HLS.

CITATION LIST

Non Patent Document

Non Patent Document 1: Takehiro Nakamura, "Toward 5G Introduction in 2020", [online], 5G Deployment toward 2020 and Beyond, MPLS Japan 2016; [searched on Jul. 27, 2018], Internet <https://www.mpls.jp/2016/presentations/20161107_MPLS-Japan2016_Nakamura.pdf>

Non Patent Document 2: H. Uzawa. et al., "Practical Mobile-DBA Scheme Considering Data Arrival Period for 5G Mobile Fronthaul with TDM-PON", 2017 European Conference on Optical Communication (ECOC).

Non Patent Document 3: D. Hisano et al., "TDM-PON for Accommodating TDD-Based Fronthaul and Secondary Services", Journal of lightwave technology, vol. 35, NO. 14, Jul. 15, 2017.

Non Patent Document 4: Y. Luo et al., "Bandwidth Allocation for Multiservice Accession EPONs", IEEE Optical Communications, February 2005.

Non Patent Document 5: H. Ou et al., "Integrated Dynamic Bandwidth Allocation for Low Buffer Aggregated Passive Optical Network Systems", Journal of optical communication network, vol. 7, No. 8, August 2015.

Non Patent Document 6: NTT, "Basic Technology Course [GE-PON Technology], 3rd Session, DBA Function", NTT Technology Journal, October 2005

SUMMARY OF THE INVENTION

Technical Problem

From an economic standpoint, the OLT may accommodate a plurality of MFHs with different latency requirements using the same TDM-PON. Furthermore, the TDM-PON is also employed in FTTH, and thus to maximize economic efficiency of FTTH, ONUs for FTTH may also be accommodated on the same TDM-PON as that for the MFH.

In these cases, the OLT may control the uplink transmission by using cooperative DBA for the ONUs connected to the lower level apparatuses for LLS (hereinafter referred to as "ONUs for LLS") and using SR-DBA for the ONUs connected to the lower level apparatuses for HLS (hereinafter referred to as "ONUs for HLS") and the ONUs for FTTH. However, the duration of a cycle (hereinafter referred to as the "DBA cycle") for computing and determining the allocation amount of the uplink data needs to be equal to or longer than the duration of the maximum RTT in the SR-DBA.

Thus, known bandwidth allocation apparatuses may fail to achieve both cooperative DBA requiring the DBA cycle to be equal to or shorter than the duration of a radio transmission cycle (low latency) and SR-DBA requiring the DBA cycle to be equal to or longer than the duration of the maximum RTT.

In light of the foregoing, an object of the present invention is to provide a bandwidth allocation apparatus, a bandwidth allocation method, and a bandwidth allocation program that can achieve both cooperative DBA and SR-DBA.

Means for Solving the Problem

An aspect of the present invention is a bandwidth allocation apparatus including: an acquisition unit configured to acquire scheduling information related to transmission of uplink data from a first subscriber line termination apparatus corresponding to a subscriber line termination apparatus needing to transfer uplink data with low latency; a requested amount reception unit configured to receive, from a second subscriber line termination apparatus corresponding to subscriber line termination apparatus not needing to transfer uplink data with low latency, information representing a requested amount related to transmission of uplink data from the second subscriber line termination apparatus, in a requested amount reception cycle corresponding to a cycle equal to or longer than a predetermined maximum round-trip time; and an allocation unit configured to allocate, in an allocation amount determination cycle shorter than the requested amount reception cycle, a bandwidth to the uplink data from the first subscriber line termination apparatus on a basis of the scheduling information, and to allocate, in the allocation amount determination cycle, a bandwidth to the uplink data from the second subscriber line termination apparatus on a basis of the information representing the requested amount.

An aspect of the present invention is the above-described bandwidth allocation apparatus, wherein the allocation unit allocates the bandwidth for transmission of information representing the requested amount, allocates, for transmission of the uplink data from the first subscriber line termination apparatus, a portion of the bandwidth remaining unallocated for transmission of the information representing the requested amount, allocates, for transmission of the uplink data from the second subscriber line termination apparatus, a portion of the bandwidth remaining unallocated for transmission of the uplink data from the first subscriber line termination apparatus, and allocates, for transmission of the uplink data from the first subscriber line termination apparatus, a portion of the bandwidth remaining unallocated for transmission of the uplink data from the second subscriber line termination apparatus.

An aspect of the present invention is the bandwidth-allocation apparatus described above, wherein the allocation unit acquires information representing a predetermined minimum amount of data and information representing a predetermined maximum amount of data, and in a case where the requested amount is smaller than the minimum amount of data, allocates a bandwidth for the minimum amount of data for transmission of the uplink data from the second subscriber line termination apparatus, and in a case where the requested amount is larger than the maximum amount of data, allocates a bandwidth for the maximum amount of data for transmission of the uplink data from the second subscriber line termination apparatus.

An aspect of the present invention is the above-described bandwidth allocation apparatus, wherein the allocation unit allocates, on a basis of weighting factors defined for the respective second subscriber line termination apparatus and the information representing the requested amount, the bandwidth for transmission of the uplink data from the second subscriber line termination apparatus with the bandwidth for an amount of data for the requested amount used as an upper limitation.

An aspect of the present invention is a bandwidth allocation method performed by a bandwidth allocation apparatus, the bandwidth allocation method including the steps of: acquiring scheduling information related to transmission of uplink data from a first subscriber line termination apparatus corresponding to a subscriber line termination apparatus needing to transfer uplink data with low latency, receiving, from second subscriber line termination apparatus corresponding to a subscriber line termination apparatus not needing to transfer uplink data with low latency, information representing a requested amount related to transmission of the uplink data from the second subscriber line termination apparatus, in a requested amount reception cycle corresponding to a cycle equal to or longer than a predetermined maximum round-trip time; and allocating, in an allocation amount determination cycle shorter than the requested amount reception cycle, a bandwidth to the uplink data from the first subscriber line termination apparatus on a basis of the scheduling information, and allocating, in the allocation amount determination cycle, a bandwidth to the uplink data from the second subscriber line termination apparatus on a basis of the information representing the requested amount.

An aspect of the present invention is the above-described bandwidth allocation method, wherein the step of allocating includes allocating the bandwidth for uplink data transmission of information representing the requested amount, allocating, for transmission of the uplink data from the first subscriber line termination apparatus, a portion of the bandwidth remaining unallocated for uplink data transmission of the information representing the requested amount, allocating, for transmission of the uplink data from the second subscriber line termination apparatus, a portion of the bandwidth remaining unallocated for transmission of the uplink data from the first subscriber line termination apparatus, and allocates, for transmission of the uplink data from the first subscriber line termination apparatus, a portion of the bandwidth remaining unallocated for transmission of the uplink data from the second subscriber line termination apparatus.

An aspect of the present invention is the above-described bandwidth allocation method, wherein the step of acquiring includes acquiring information representing a predetermined minimum amount of data and information representing a predetermined maximum amount of data, and in a case where the requested amount is smaller than the minimum amount of data, allocating a bandwidth for the minimum amount of data for the uplink data from the second subscriber line termination apparatus, and in a case where the requested amount is larger than the maximum amount of data, allocating a bandwidth for the maximum amount of data for the uplink data from the second subscriber line termination apparatus.

An aspect of the present invention is a bandwidth allocation program for causing a computer to function as the above-described bandwidth allocation apparatus described above.

Effects of the Invention

According to the present invention, both cooperative DBA and SR-DBA can be achieved.

DESCRIPTION OF EMBODIMENTS

Embodiments of the present invention will be described in detail with reference to the drawings.

First Embodiment

Figure 1:
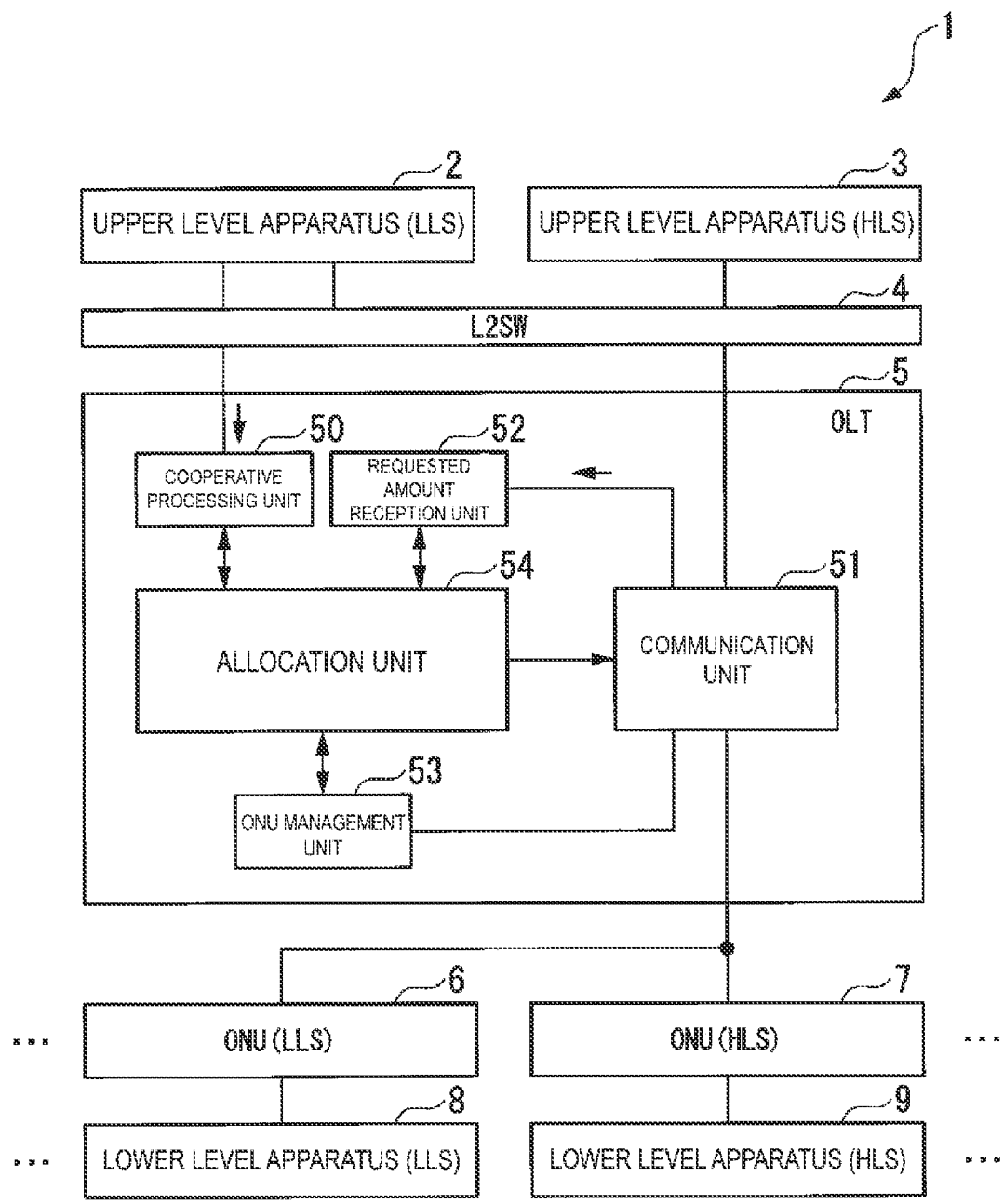
FIG. 1 is a diagram illustrating an example of a configuration of an optical communication system according to a first embodiment.

FIG. 1 is a diagram illustrating an example of a configuration of an optical communication system 1. The optical communication system 1 is a system that communicates using an optical signal. The optical communication system 1 includes an upper level apparatus 2, an upper level apparatus 3, an L2SW 4, an OLT 5, one or more ONUs 6, one or more ONUs 7, one or more lower level apparatus 8, and one or more lower level apparatus 9.

The upper level apparatus 2 is an apparatus for LLS that is at an upper layer than the OLT 5. The upper level apparatus 2 transmits scheduling information regarding the lower level apparatus 8 for LLS to the OLT 5. The upper level apparatus 2 receives uplink data transmitted by the ONUs 6 for LLS from the OLT 5 via the L2SW 4.

The upper level apparatus 3 is an apparatus for HLS that is at an upper layer than the OLT 5. The upper level apparatus 3 receives uplink data transmitted by the ONUs 7 for HLS from the OLT 5 via the L2SW 4.

The L2SW 4 is a layer 2 switch. The L2SW 4 relays data between the upper level apparatus 2 and the OLT 5. The L2SW 4 relays the data between the upper level apparatus 3 and the OLT 5.

The OLT 5 is a terminal station apparatus. The OLT 5 performs control related to uplink transmission. The OLT 5 performs allocation for cooperative DBA to allocate the ONUs 6 with a bandwidth for uplink data from the ONUs 6 for LLS. The OLT 5 performs allocation for SR-DBA to allocate the ONUs 7 with a bandwidth for uplink data from the ONUs 7 for HLS.

Each of the ONUs 6 is a subscriber line termination apparatus for LLS. The ONU 6 transmits the uplink data received from the lower level apparatus 8 on the basis of an allocation amount notified by the OLT 5. The uplink data from the ONU 6 needs to be transferred with low latency.

Each of the ONUs 7 is a subscriber line termination apparatus for HLS. The ONU 7 transmits the uplink data received from the lower level apparatus 9 on the basis of the allocation amount notified by the OLT 5. The uplink data from the ONU 7 need not be transferred with low latency.

The lower level apparatus 8 is an apparatus for LLS that is at a lower layer than the OLT 5. The lower level apparatus 8 performs wireless communication with a user terminal (not illustrated). The lower level apparatus 8 transmits the mobile data received from the user terminal, to the ONUs 6 as uplink data. The uplink data from the lower level apparatus 8 needs to be transferred with low latency.

The lower level apparatus 9 is an apparatus for HLS that is at a lower layer than the OLT 5. The lower level apparatus 9 performs wireless communication with a user terminal (not illustrated). The lower level apparatus 8 transmits mobile data received from the user terminal, to the ONUs 7 as uplink data. The uplink data from the lower level apparatus 9 need not be transferred with low latency.

Now, the configuration of the OLT 5 will be described in detail. The OLT 5 includes a cooperative processing unit 50, a communication unit 51, a requested amount reception unit 52, an ONU management unit 53, and an allocation unit 54.

The functional units are implemented by a processor such as a central processing unit (CPU) executing a program stored in a storage unit. The functional units may be implemented by using hardware such as a large scale integration (LSI) or an application specific integrated circuit (ASIC).

The cooperative processing unit 50 is an acquisition unit acquiring the scheduling information from the upper level apparatus 2. The cooperative processing unit 50 extracts information representing an uplink data reception time and the amount of uplink data for the lower level apparatus 8 for LLS, from the scheduling information for every radio transmission cycle.

The communication unit 51 transmits an instruction to the ONUs 7 requesting notification of the requested amount related to transmission of the uplink data. The communication unit 51 receives, from the ONUs 7, information representing the requested amount related to the transmission of the uplink data from the ONUs 7. The communication unit 51 outputs, to the requested amount reception unit 52, the information representing the requested amount related to the transmission of the uplink data from the ONUs 7.

Note that the communication unit 51 may receive, from the ONUs 6, the information representing the requested amount related to the transmission of the uplink data from the ONUs 6.

The communication unit 51 notifies the ONUs 6 and the ONUs 7 of the allocation amount of the uplink data allocated by the allocation unit 54, for example, for every allocation amount computation cycle (allocation amount determination cycle). In other words, the communication unit 51 transmits information representing the allocation amount of uplink data from the ONUs 6, to the ONUs 6, for example, for every allocation amount computation cycle. The communication unit 51 transmits information representing the allocation amount of the uplink data from the ONUs 7, to the ONUs 7, for example, for every allocation amount computation cycle.

The communication unit 51 transmits the uplink data acquired from the ONUs 6, to the upper level apparatus 2 via the L2SW 4. The communication unit 51 transmits the uplink data acquired from the ONUs 7, to the upper level apparatus 3 via the L2SW 4.

The requested amount reception unit 52 acquires information representing the requested amount related to transmission of the uplink data from the communication unit 51. The requested amount reception unit 52 stores information representing the requested amount related to transmission of the uplink data from each ONU. In a case of newly acquiring, from the communication unit 51, information representing the requested amount related to the transmission of the uplink data, the requested amount reception unit 52 updates, for each ONU, the information representing the requested amount related to the transmission of the uplink data. The requested amount reception unit 52 outputs, to the allocation unit 54, information representing the requested amount related to the transmission of the uplink data from the ONUs specified by the allocation unit 54.

The ONU management unit 53 is a non-volatile recording medium (non-transitory recording medium), for example, a flash memory, a hard disk drive (HDD), or the like. The ONU management unit 53 may include a volatile recording medium, for example, a random access memory (RAM) or a register.

The ONU management unit 53 stores, for example, programs and a data table. In the data table, the following are associated with one another; the unique identifier of the ONU that can be connected to the OLT 5, a set value (ONU_TYPE) representing whether the ONU is an ONU for LLS, and a logical link identifier. The unique identifier and the set value (ONU_TYPE) are pre-recorded in the data table by an external apparatus or the like. The logical link identifier is uniquely imparted to the ONU when a connection between the OLT and the ONU is established.

Note that, in a case where the logical link identifier imparted to the ONU when the ONU is connected to the OLT can be handled as an ONU specific identifier, the logical link identifier and the set value (ONU_TYPE) may be recorded in the data table instead of the unique identifier being recorded in the data table.

The ONU management unit 53 measures the number of ONUs that have been connected to the OLT 5. The ONU management unit 53 notifies the allocation unit 54 of the number of ONUs that have been connected to the OLT 5. In a case of being notified of the logical link identifier by the allocation unit 54, the ONU management unit 53 reads, from the data table, the set value (ONU_TYPE) associated with the notified logical link identifier, and notifies the set value.

The allocation unit 54 acquires information representing the requested amount related to the transmission of the uplink data from the ONUs 6 for LLS (information including the uplink data reception time and the amount of uplink data), from the cooperative processing unit 50 for every predetermined allocation amount computation cycle. The allocation unit 54 acquires information representing the requested amount related to the transmission of the uplink data from the ONUs 7 for HLS (information representing the amount of data accumulated in the buffer), from the requested amount reception unit 52 for every predetermined allocation amount computation cycle.

On the basis of the information representing the requested amount related to the transmission of the uplink data from the ONUs 6 for LLS, the allocation unit 54 determines the allocation amount of the uplink data from the ONUs 6. On the basis of information representing the requested amount related to the transmission of the uplink data from the ONUs 7 for HLS, the allocation unit 54 determines the allocation amount of the uplink data from the ONUs 7. The allocation unit 54 outputs, to the communication unit 51, information representing the determined allocation amount.

In the processing for determining the allocation amount of the uplink data from each ONU, the allocation unit 54 performs, besides the allocation of the amount of data for notification of the requested amount related to the transmission of the uplink data from the ONUs 7 for HLS (allocation for requested amount notification), the allocation of the bandwidth for the uplink data from the ONUs 6 for LLS (allocation for cooperative DBA) in preference to the allocation of the uplink data from the ONUs 7 for HLS (allocation for SR-DBA).

For example, during the period in which the requested amount related to the transmission of the uplink data from all the ONUs 6 for LLS is 0, the allocation unit 54 performs allocation of the uplink data from the ONUs 7 for HLS (allocation for SR-DBA) on the basis of the requested amount related to the transmission of the uplink data from the ONUs 7 for HLS. In a case where both the requested amount related to the transmission of the uplink data from the ONUs 6 for LLS and the requested amount related to the transmission of the uplink data from the ONUs 7 for HLS are 0, the allocation unit 54 evenly allocates the ONUs 6 for LLS with the bandwidth for the uplink data from the ONUs 6 for LLS.

An allocation cycle number for the allocation of the amount of data for notification of the requested amount related to the transmission of the uplink data from the ONUs 7 for HLS (allocation for notification of the requested amount) is a number determined in advance. The allocation number for the allocation for notification of the requested amount is a number represented by Equation (1).

[Math. 1]

$$\text{REQUESTED AMOUNT NOTIFICATION ALLOCATION CYCLE NUMBER} = \left\lceil \frac{\text{ALLOCATION CYCLE LENGTH} \times \text{NUMBER OF } HLS \text{ ALLOCATION CYCLES} - \text{MAXIMUM } RTT}{\text{ALLOCATION CYCLE LENGTH}} \right\rceil \quad (1)$$

Figure 2:
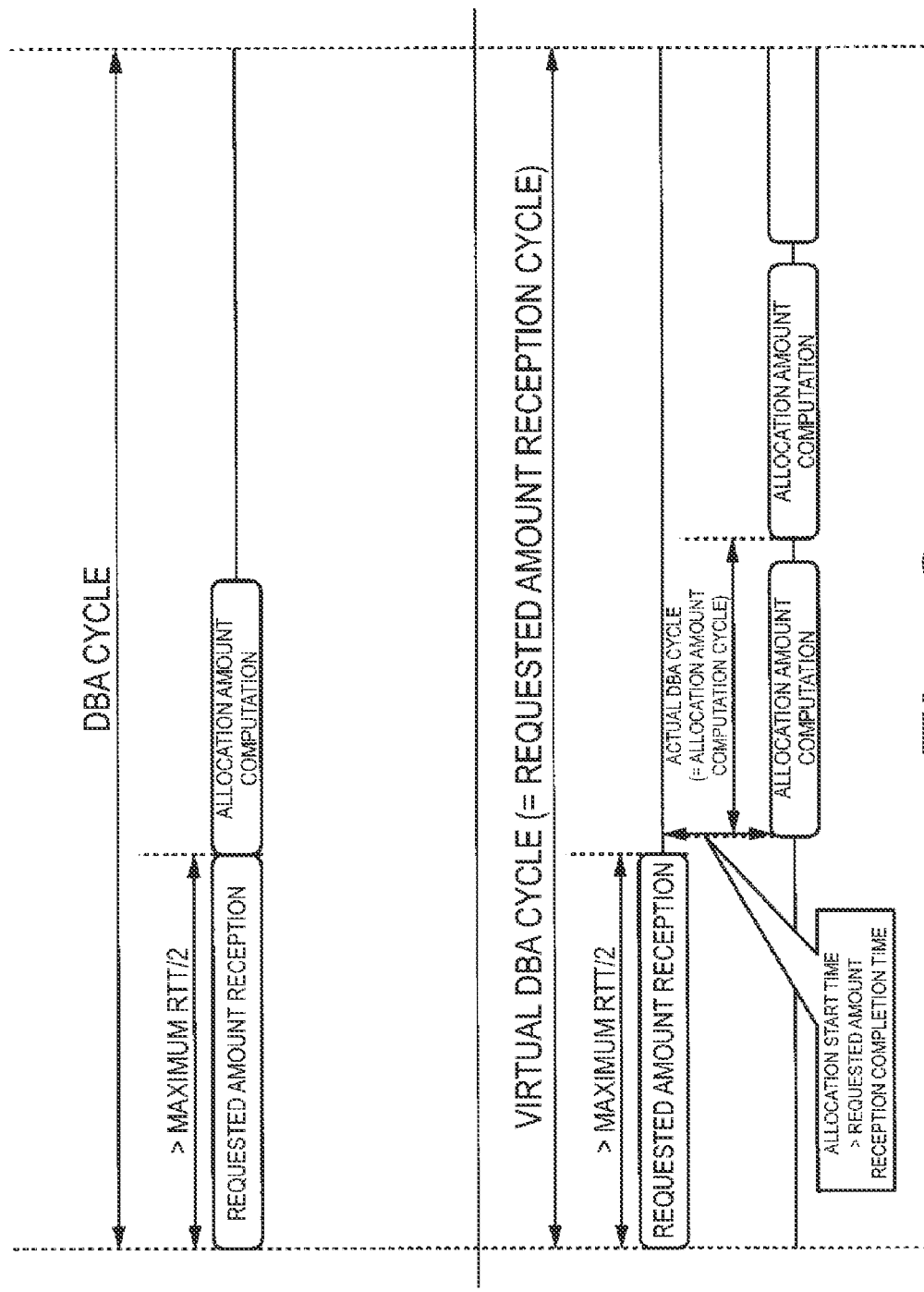
FIG. 2 is a diagram illustrating a comparison between known SR-DBA processing and an example of SR-DBA processing performed by an allocation unit.

FIG. 2 is a diagram illustrating a comparison between known SR-DBA processing and an example of SR-DBA processing executed by the allocation unit 54. An upper stage in FIG. 2 represents the known SR-DBA processing. A lower stage in FIG. 2 represents the SR-DBA processing executed by the allocation unit 54.

In the known SR-DBA processing, the OLT starts computing the allocation amount of the uplink data after receiving the requested amount from all of the ONUs connected to the OLT. Thus, the OLT performs the requested amount reception processing and the allocation amount computation processing within the same DBA cycle. In the known SR-DBA processing, the OLT uses completion of the requested amount reception processing as an activation trigger for the allocation amount computation processing.

In contrast, in the SR-DBA processing executed by the allocation unit 54, the allocation unit 54 executes the requested amount reception processing and the allocation amount computation processing in different DBA cycles. In other words, the allocation unit 54 separates a requested amount reception cycle from an allocation amount computation cycle, and executes the requested amount reception cycle and the allocation amount computation cycle.

The duration of a virtual DBA cycle, corresponding to the period of the requested amount reception processing (requested amount reception cycle), is the same as the DBA cycle length of the known SR-DBA processing. The duration of the allocation amount computation processing (the allocation amount computation cycle) is the same as the duration of the DBA cycle of the cooperative DBA. In this manner, the allocation unit 54 performs only the allocation amount computation cycle for SR-DBA in the same cycle as that of the cooperative DBA to merge the cooperative DBA and SR-DBA.

In the allocation amount computation process, the allocation unit 54 compares an allocation start time (the start time of the allocation amount computation cycle) with a requested amount reception completion time for every allocation amount computation cycle (actual DBA cycle). In a case where the allocation start time is greater than the requested amount reception completion time (in a case where the allocation start time is later than the requested amount reception completion time), the allocation unit 54 acquires information representing the requested amount related to the transmission of the uplink data. The allocation unit 54 computes the allocation amount of the uplink data on the basis of the information representing the requested amount related to the transmission of the uplink data.

The duration of the allocation amount computation cycle is the same as the duration of the DBA cycle of the cooperative DBA, and thus the allocation amount computation cycle (actual DBA cycle) is shorter than the known DBA cycle. Accordingly, the allocation unit 54 may fail to allocate all of the bandwidth within the same allocation amount computation cycle. Thus, in the allocation amount computation processing, the allocation unit 54 holds the information regarding the amount of uplink data in an unallocated portion of the bandwidth, and carries over the amount of uplink data as the requested amount related to the transmission of the uplink data in the next allocation amount computation cycle.

Figure 3:
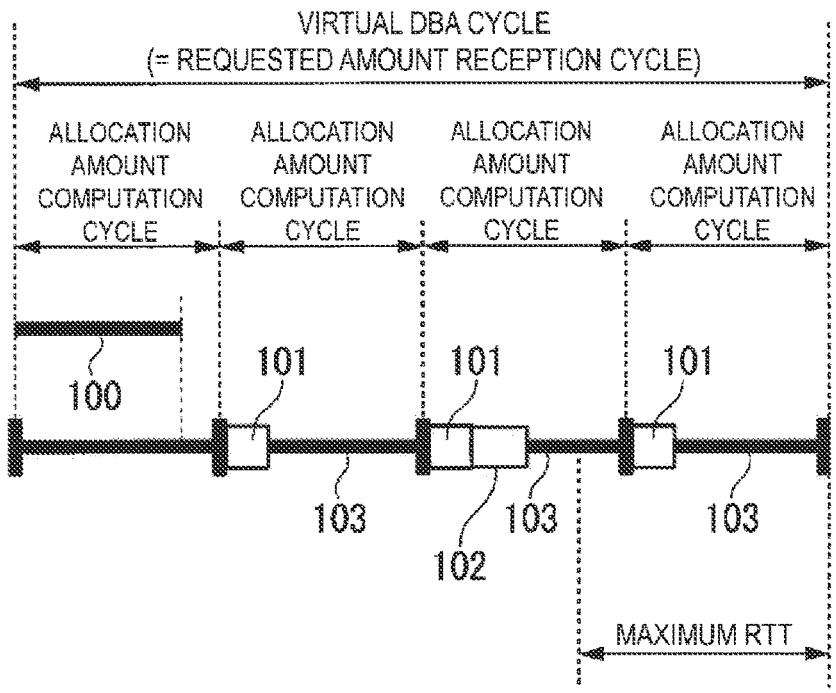
FIG. 3 is a diagram illustrating an example of timings for DBA processing according to the first embodiment.

FIG. 3 is a diagram illustrating an example of timings for the DBA processing. The requested amount reception unit 52 executes the requested amount reception 100 processing. During a time period from the start time of the allocation amount computation cycle at or later than the time of completion of the requested amount reception 100, until the maximum RTT before the end time of the requested amount reception cycle, the allocation unit 54 performs the allocation for notification of the requested amount for the ONUS 7 for HLS (allocation for requested amount notification 102) regardless whether a portion of the bandwidth (remaining bandwidth) is present that is not allocated to the ONUs 6 by allocation for cooperative DBA 101.

In FIG. 3, the allocation unit 54 performs the allocation for cooperative DBA 101 and allocation for SR-DBA 103 in the same allocation amount computation cycle. In the requested amount reception cycle, the allocation unit 54 uses the allocation for SR-DBA 103 to allocate the ONUs 7 with a portion of the bandwidth (remaining bandwidth) that is other than a portion of the bandwidth allocated by allocation for requested amount notification 102 and that has not been allocated to the ONUs 6 by the allocation for cooperative DBA 101.

The allocation unit 54 uses further allocation for cooperative DBA to allocate the ONUs 6 for LLS with a portion of the bandwidth left over after both the allocation for cooperative DBA 101 and the allocation for SR-DBA 103. The reason why the ONUs 6 for LLS are allocated with the portion of the bandwidth left over after both the allocation for cooperative DBA 101 and the allocation for SR-DBA 103 is that cooperative DBA requires lower latency than SR-DBA.

Figure 4:
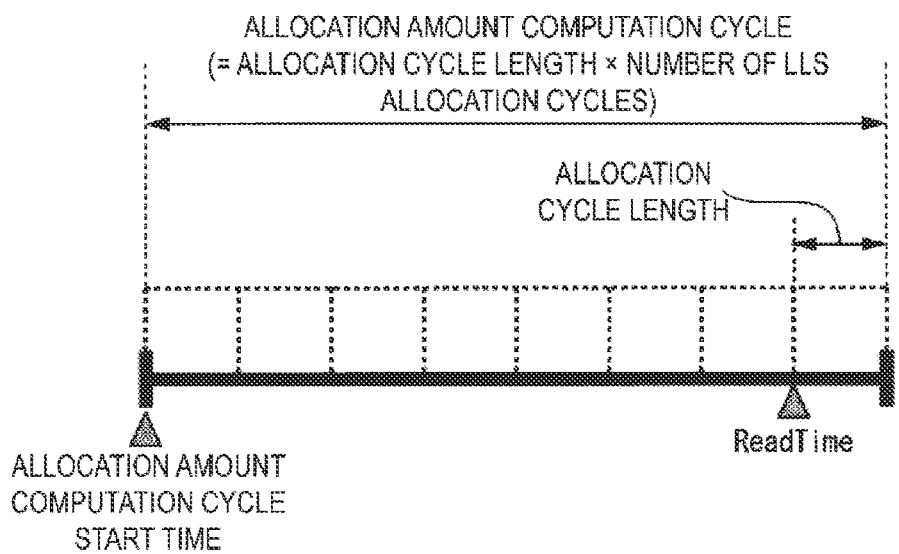
FIG. 4 is a diagram illustrating an example of the time when information representing a requested amount is read from a cooperative processing unit according to the first embodiment.

FIG. 4 is a diagram illustrating an example of the time of reading information representing the requested amount from the cooperative processing unit 50. The time "ReadTime" when the requested amount is read from the cooperative processing unit 50 is a variable representing the time corresponding to the result of subtraction of the allocation cycle length from the end time of the time period for allocation (the end time of the allocation amount computation cycle) ("ReadTime" is the time the allocation cycle length before the end time of the allocation amount computation cycle).

A duration (hereinafter referred to as the "allocation cycle length") is predetermined that corresponds to the minimum unit of the period (hereinafter referred to as the "allocation cycle") to which the allocation unit 54 allocates the uplink data. The minimum value of the uplink data amount of uplink data (hereinafter referred to as the "minimum amount of arrival") that may arrive at the ONU 6 for LLS from the lower level apparatus 8 in the allocation cycle is predetermined.

The allocation cycle length is the duration obtained by splitting the allocation amount computation cycle into a plurality of portions. The duration of the allocation amount computation cycle is the same as the duration of a wireless transmission period of the lower level apparatus 8 (a period equal to or shorter than an uplink transmission scheduling period defined between the upper level apparatus 2 and the lower level apparatus 8). The number of splits is the number of allocation cycles for the uplink data from the ONUs 6 for LLS (hereinafter referred to as the "number of LLS allocation cycles").

Hereinafter, an integer obtained by dividing the requested amount reception cycle by the allocation cycle length is referred to as the "number of HLS allocation cycles". The duration of the DBA cycle of cooperative DBA is the same value as that of the "allocation cycle length×number of LLS allocation cycles". The duration of the DBA cycle of SR-DBA is the same value as that of the "allocation cycle length×number of HLS allocation cycles".

Figure 5:
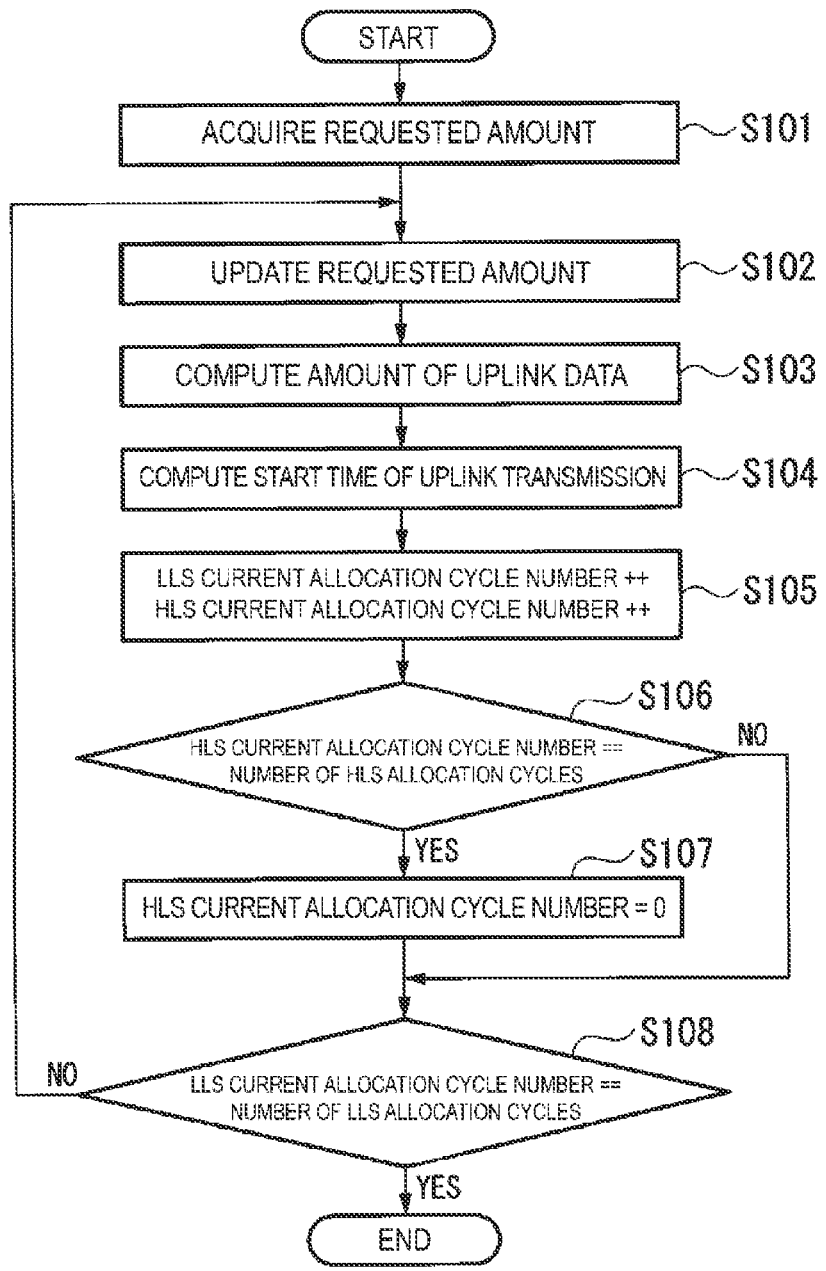
FIG. 5 is a flowchart illustrating an example of a procedure for computing an allocation amount according to the first embodiment.

Now, operations of the optical communication system 1 will be described. FIG. 5 is a flowchart illustrating an example of a procedure for computing the allocation amount. The allocation unit 54 performs operations of the flowchart illustrated in FIG. 5 for every allocation amount computation cycle.

The allocation unit 54 acquires, from the cooperative processing unit 50, the information representing the requested amount related to transmission of the uplink data from the ONUs 6 for LLS (the uplink data reception time and the amount of uplink data). The allocation unit 54 acquires, from the requested amount reception unit 52, the information representing the requested amount related to the transmission of the uplink data from the ONUs 7 for HLS (step S101).

The requested amount reception unit 52 and the allocation unit 54 update the information representing the requested amount (RequestSize) related to the transmission of the uplink data (step S102). The allocation unit 54 computes, for each ONU, the amount of uplink data for which the uplink transmission is allowed (step S103). On the basis of the amount of uplink data from each ONU, the allocation unit 54 computes the start time of the uplink transmission from each ONU (step S104), as in the processing described in, for example, Non Patent Document 2. The allocation unit 54 increments the current allocation cycle number for LLS (hereinafter referred to as the "LLS current allocation cycle number"). The allocation unit 54 increments the current allocation cycle number for HLS (hereinafter referred to as the "HLS current allocation cycle number") (step S105).

The allocation unit 54 determines whether the HLS current allocation cycle number is equal to the number of HLS allocation cycles or not (step S106). In a case where the HLS current allocation cycle number is different from the number of HLS allocation cycles (step S106: NO), the allocation unit 54 advances the processing to step S108. In a case where the HLS current allocation cycle number is equal to the number of HLS allocation cycles and the number of HLS allocation cycles (step S106: YES), the allocation unit 54 sets the HLS current allocation cycle number to 0 (step S107). Note that the HLS current allocation cycle number is not cleared to 0 even in a case where the end of the present flow is reached, and is retained.

The allocation unit 54 determines whether the LLS current allocation cycle number is equal to the number of LLS allocation cycles or not (step S108). In a case where the LLS current allocation cycle number is different from the number of LLS allocation cycles (step S108: NO), the allocation unit 54 returns the processing back to step S102. In a case where the LLS current allocation cycle number is equal to the number of LLS allocation cycles (step S108: YES), then the allocation unit 54 terminates the processing illustrated in FIG. 5. The LLS current allocation cycle number is different from the HLS current allocation cycle number and is cleared to 0 once the end of the flowchart illustrated in FIG. 5 is reached.

Hereinafter, the variable "id" represents the identification information uniquely imparted to the ONUs connected to the OLT 5. This identification information is an internal ID in the allocation unit 54.

Figure 6:
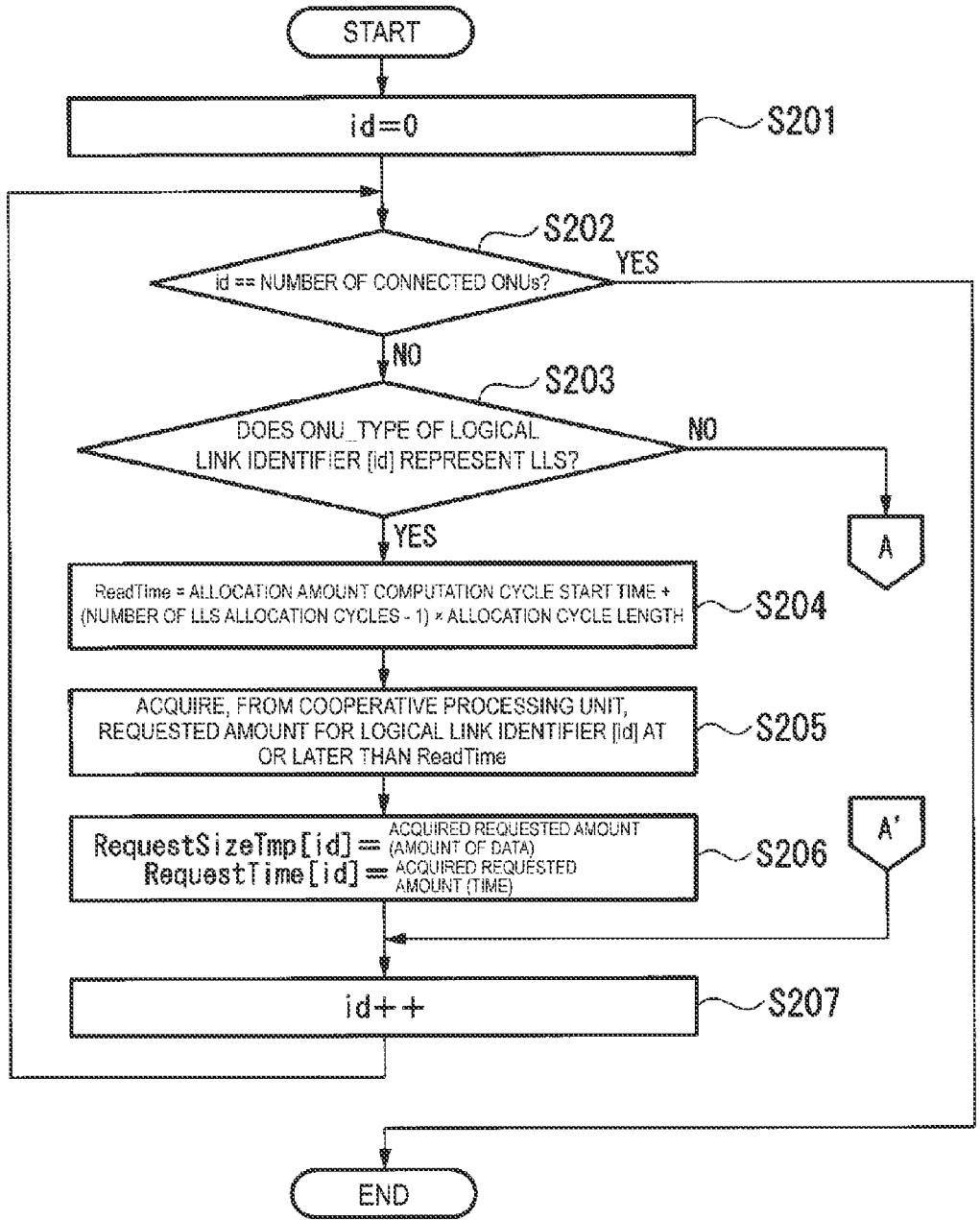
FIG. 6 is a flowchart illustrating an example of a procedure for acquiring the requested amount of data from ONUs for LLS according to the first embodiment.

FIG. 6 is a flowchart illustrating an example of a procedure for acquiring the requested amount of data from the ONUs 6 for LLS (step S101 in FIG. 5). Letters or numbers at advance destinations of determination processing in the flowchart described below indicate advances to steps with the same letters or numbers. For example, the letter "A" at the advance destination of the determination processing in step S203 in FIG. 6 indicates an advance to processing in step S301 in FIG. 7 with the same letter "A".

The allocation unit 54 substitutes 0 into the variable "id" (step S201). The allocation unit 54 determines whether the variable "id" is equal to the number of ONUs connected to the OLT 5 (step S202). In a case where the variable "id" is equal to the number of ONUs connected to the OLT 5 (step S202: YES), the allocation unit 54 terminates the processing illustrated in FIG. 6. In a case where the variable "id" is different from the number of ONUs connected to the OLT 5 (step S202: NO), the allocation unit 54 determines whether the ONU_TYPE of the logical link identifier [id] represents LLS (step S203).

In a case where the ONU_TYPE of the logical link identifier [id] represents HLS (step S203: YES), the allocation unit 54 advances the processing to step S301 in FIG. 7. In a case where the ONU_TYPE of the logical link identifier [id] represents LLS (step S203: YES), the allocation unit 54 substitutes the result of the "allocation amount computation cycle start time+(the number of LLS allocation cycles−1)× allocation cycle length" into the variable "ReadTime" (step S204). The allocation unit 54 acquires, from the cooperative processing unit 50, information representing the requested amount for the logical link identifier [id] at or later than the variable "ReadTime" (step S205).

The upper level apparatus 2 notifies the cooperative processing unit 50 of the variable "ReadTime" and the logical link identifier (logical link identifier [id]) of the target ONU. The cooperative processing unit 50 searches for information representing the uplink data reception time at or later than the time "ReadTime". In a case where the information representing the uplink data reception time at or later than the time "ReadTime" is present in the memory of the cooperative processing unit 50, the cooperative processing unit 50 notifies the allocation unit 54 of the uplink data reception time and the amount of uplink data as information representing the requested amount. To avoid overlapping reads, the cooperative processing unit 50 deletes, from the memory of the cooperative processing unit 50, the information representing the uplink data reception time and the information representing the amount of uplink data, notified to the allocation unit 54.

In a case where the information representing the uplink data reception time at or later than the time "ReadTime" is not present in the memory of the cooperative processing unit 50, the cooperative processing unit 50 notifies the allocation unit 54 of the uplink data reception time "0" and the amount of uplink data "0" as information representing the requested amount.

The allocation unit 54 substitutes the amount of input data corresponding to the acquired requested amount into the variable "RequestSizeTmp[id]". The allocation unit 54 substitutes the acquired requested amount of the uplink data reception time into the variable "RequestTime[id]" (step S206). The allocation unit 54 increments the variable "id" (step S207). The allocation unit 54 returns the processing back to step S202.

Figure 7:
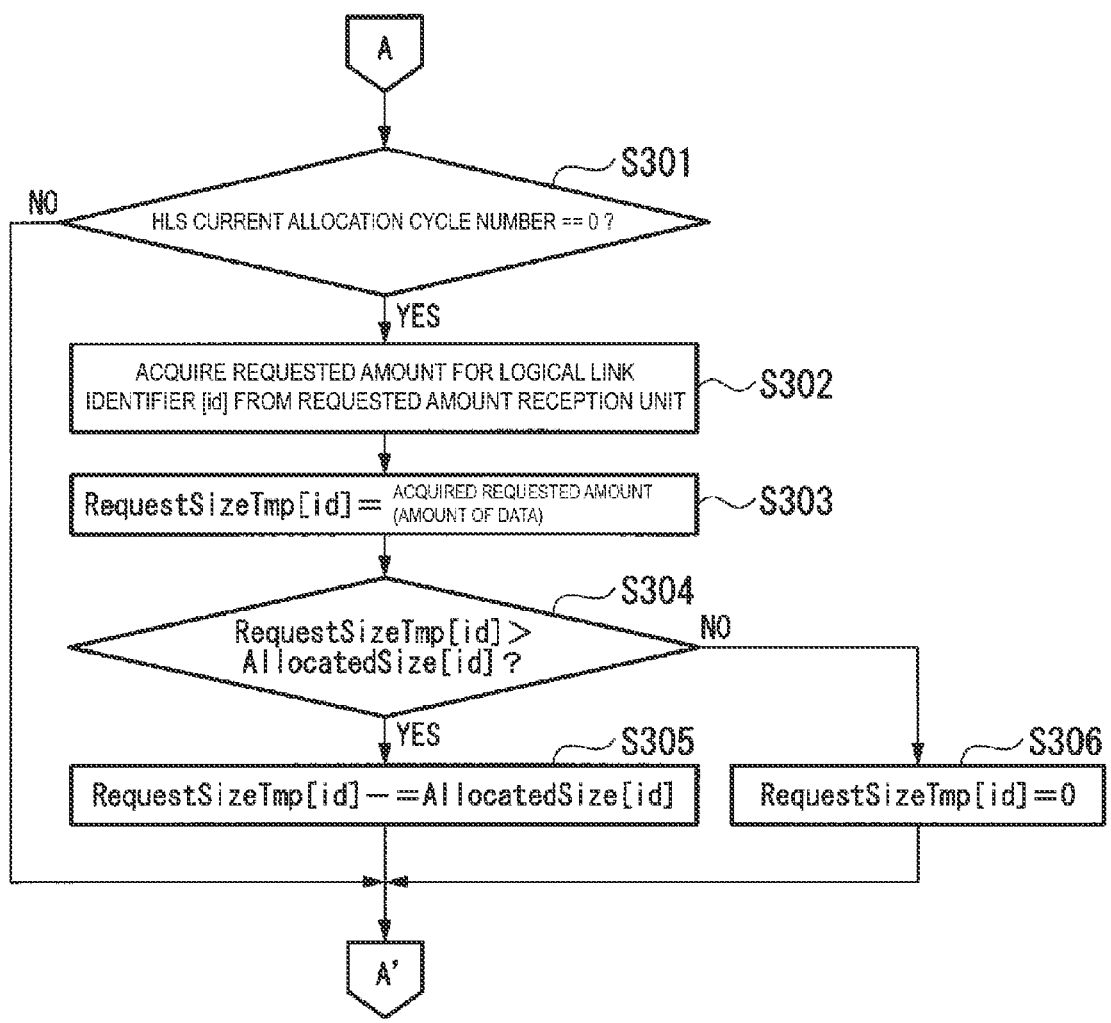
FIG. 7 is a flowchart illustrating an example of a procedure for acquiring the requested amount of data from ONUs for HLS according to the first embodiment.

FIG. 7 is a flowchart illustrating an example of a procedure for acquiring the requested amount of data from the ONUS 7 for HLS (step S101 in FIG. 5). The allocation unit 54 determines whether the HLS current allocation cycle number is 0 or not. In other words, the allocation unit 54 determines whether the current time is the start time of the DBA cycle of SR-DBA (step S301). In a case where the HLS current allocation cycle number is not 0 (step S301: NO), the allocation unit 54 returns the processing back to step S207 in FIG. 6.

In a case where the HLS current allocation cycle number is 0 (step S301: YES), the allocation unit 54 acquires the requested amount for the logical link identifier [id] from the requested amount reception unit 52 (step S302). The allocation unit 54 substitutes the requested amount for the logical link identifier [id] (amount of uplink data) into the variable "RequestSizeTmp[id]" (step S303). The allocation unit 54 determines whether the value of the variable "RequestSizeTmp[id]" is greater than the value of the variable "AllocatedSize[id]" (step S304).

In a case where the value of the variable "RequestSizeTmp[id]" is greater than the value of the variable "AllocatedSize[id]" (step S304: YES), the allocation unit 54 subtracts the value of the allocated amount of uplink data (AllocatedSize[id]) from the value of the requested amount (RequestSize) of the logical link identifier [id].

Here, the reason why the allocation unit 54 subtracts the allocated amount of data (AllocatedSize[id]) from the value of the requested amount for the logical link identifier [id] includes that the amount of uplink data accumulated in the buffer of the ONU at the notification time point is notified to the OLT 5 as the requested amount for the ONU, and thus data decided to be transmitted is also included in the requested amount for the logical link identifier [id] (step S305).

Note that in a case where the ONU removes the data decided to be transmitted to notify the OLT 5 of the obtained requested amount, in step S305, the allocation unit 54 does not subtract the allocated amount of data (AllocatedSize[id]) from the value of the requested amount (RequestSize) of the logical link identifier [id].

In a case where the value of the variable "RequestSizeTmp[id]" is equal to or smaller than the variable "AllocatedSize[id]" (step S304: NO), the allocation unit 54 substitutes 0 into the variable "RequestSizeTmp[id]" (step S306).

Hereinafter, the number of ONUs for LLS for which the variable "RequestSize" is not 0 in the allocation cycle is referred to as the "number of LLS effective ONUs". Hereinafter, the number of ONUs for HLS for which the variable "RequestSize" is not 0 in the allocation cycle is referred to as the "number of HLS effective ONUs". Regardless of the value of the variable "RequestSize", the number of ONUs for LLS connected to the OLT is referred to as the "number of LLS connected ONUs".

Figure 8:
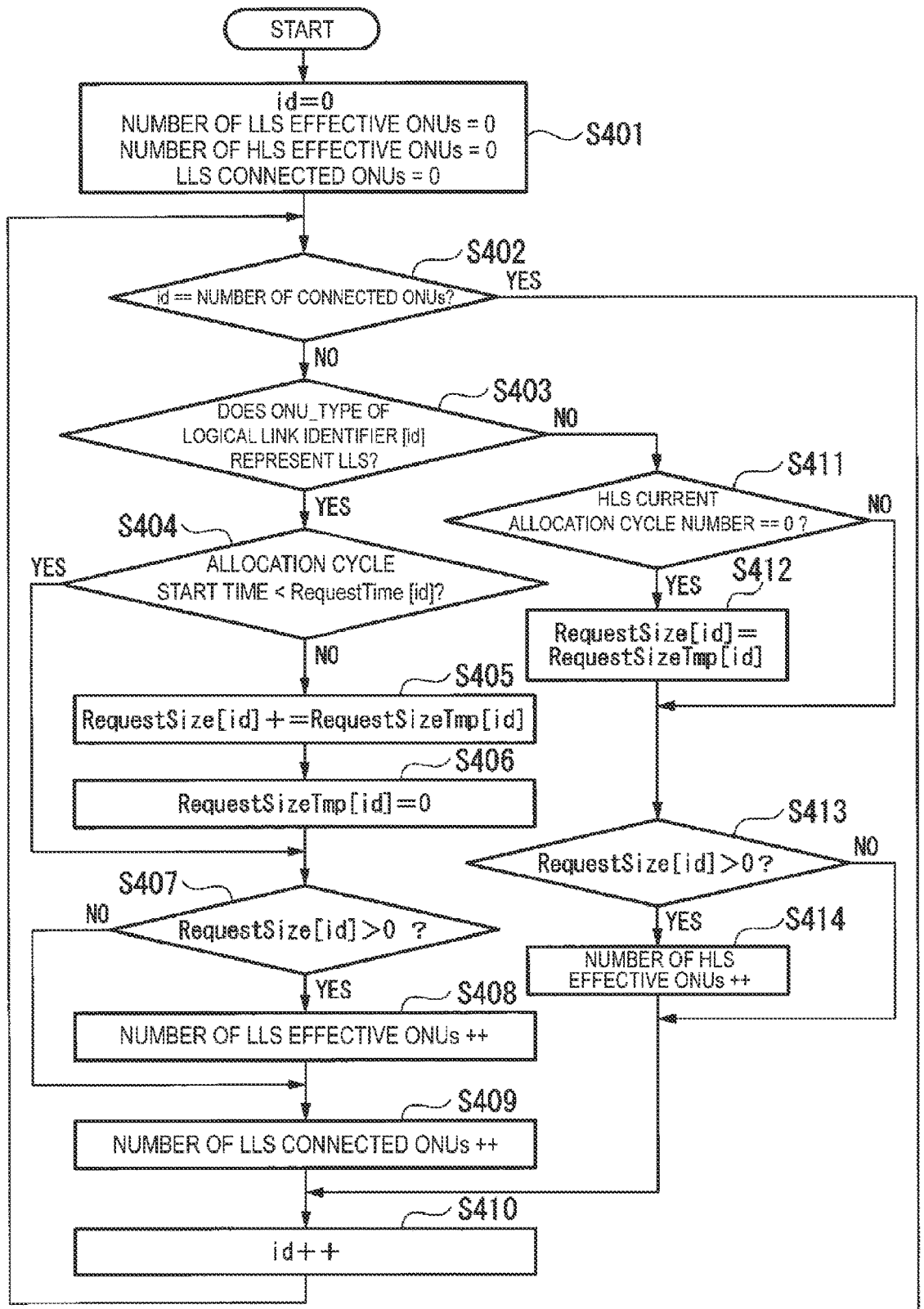
FIG. 8 is a flowchart illustrating an example of a procedure for updating the requested amount of data from the ONUs according to the first embodiment.

FIG. 8 is a flowchart illustrating an example of a procedure for updating the requested amount of data from the ONUs (step S102 in FIG. 5). The allocation unit 54 substitutes 0 into the variable "id", substitutes 0 into the variable "number of LLS effective ONUs", substitutes 0 into the variable "number of HLS effective ONUs", and substitutes 0 into the variable "number of LLS connected ONUs" (step S401).

The allocation unit 54 determines whether the variable "id" is equal to the number of connected ONUs (step S402). In a case where the variable "id" is equal to the number of connected ONUs (step S401: YES), the allocation unit 54 terminates the processing illustrated in FIG. 8. In a case where the variable "id" is different from the number of connected ONUs (step S401: NO), the allocation unit 54 determines whether the set value of the logical link identifier [id] (ONU_TYPE) represents LLS or not (step S403).

In a case where the set value (ONU_TYPE) of the logical link identifier [id] represents LLS (step S403: YES), the allocation unit 54 determines whether the allocation cycle start time is earlier than the time "RequestTime[id]" (step S404). In a case where the allocation cycle start time is earlier than the time "RequestTime[id]" (step S404: YES), the allocation unit 54 advances the processing to step S407.

In a case where the allocation cycle start time is at or later than the time "RequestTime[id]" (step S404: NO), the allocation unit 54 adds the value of the variable "RequestSizeTmp[id]" to the value of the variable "RequestSize[id]," representing the requested amount (step S405). The allocation unit 54 sets the value of the variable "RequestSizeTmp[id]" to 0 (step S406).

The allocation unit 54 determines whether the value of the variable "RequestSize[id]" is greater than 0 or not (step S407). In a case where the value of the variable "RequestSize[id]" is 0 or smaller (step S407: NO), the allocation unit 54 advances the processing to step S409. In a case where the value of the variable "RequestSize[id]" is greater than 0 (step S407: YES), the allocation unit 54 increments the value of the variable "number of LLS effective ONUs" (step S408).

The allocation unit 54 increments the value of the variable "number of LLS connected ONUs" (step S409). The allocation unit 54 increments the value of the variable "id" (step S410). The allocation unit 54 returns the processing back to step S402.

In a case where the set value (ONU_TYPE) of the logical link identifier [id] represents HLS (step S403: NO), the allocation unit 54 determines whether the variable "HLS current allocation cycle number" is equal to 0 or not (step S411). In a case where the variable "HLS current allocation cycle number" is different from 0 (step S411: NO), the allocation unit 54 advances the processing to step S413. In a case where the variable "HLS current allocation cycle number" is equal to 0 (step S411: YES), the allocation unit 54 substitutes the value of the variable "RequestSizeTmp[id]" into the value of the variable "RequestSize[id]" (step S412).

The allocation unit 54 determines whether the value of the variable "RequestSize[id]" is greater than 0 (step S413). In a case where the value of the variable "RequestSize[id]" is 0 or smaller (step S413: NO), the allocation unit 54 advances the processing to step S410.

In a case where the value of the variable "RequestSize[id]" is greater than 0 (step S407: YES), the allocation unit 54 increments the value of the variable "number of HLS effective ONUs" (step S414). The allocation unit 54 advances the processing to step S410.

Figure 9:
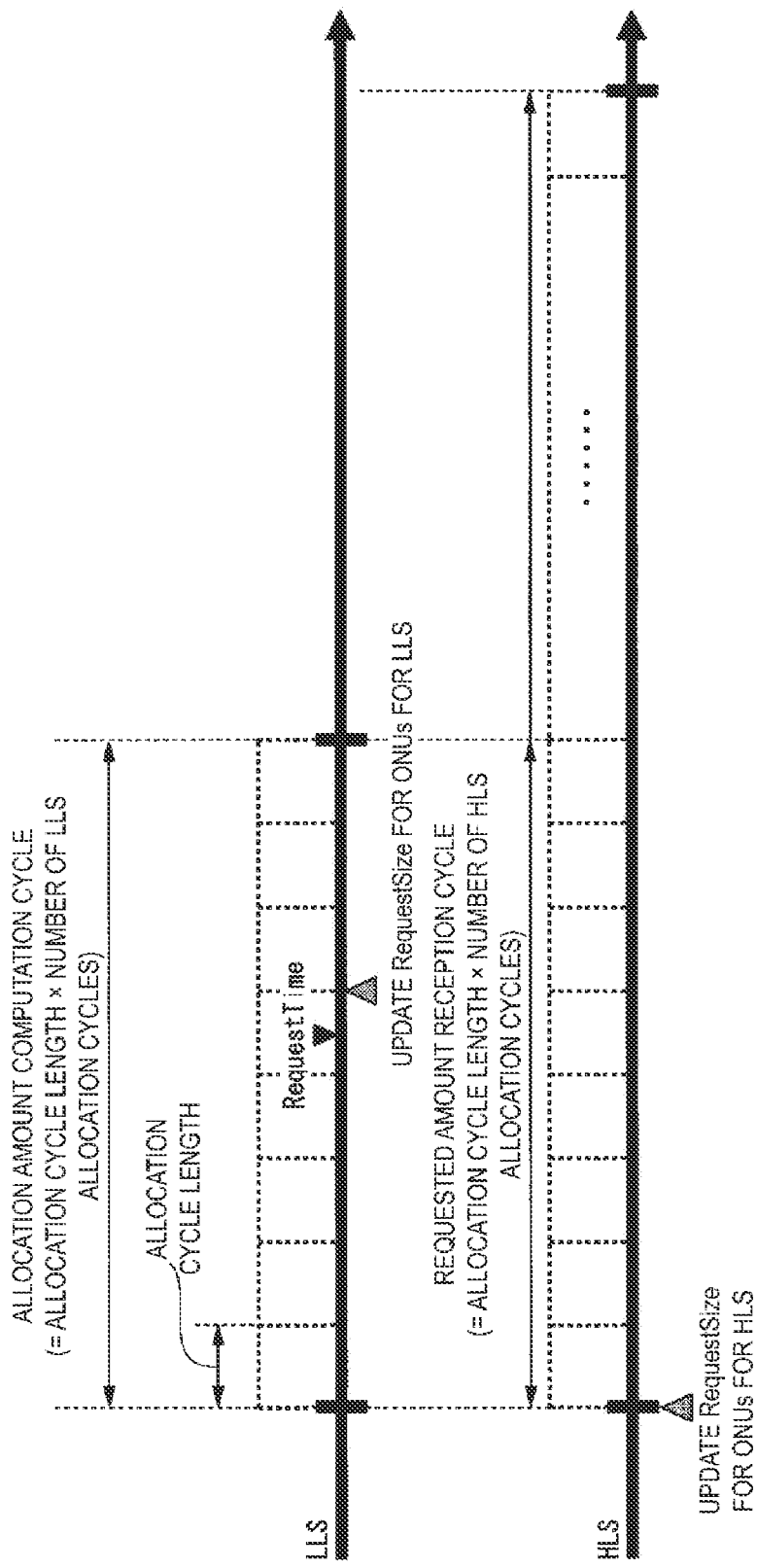
FIG. 9 is a diagram illustrating an example of timings for updating the requested amount of data from the ONUs according to the first embodiment.

FIG. 9 is a diagram illustrating an example of timings for updating the requested amount of data from the ONU. In a case where the allocation cycle start time is at or later than the time "RequestTime", the allocation unit 54 updates the variable "RequestSize" for the ONUs for LLS. In a case where the HLS current allocation cycle number is 0, the allocation unit 54 updates the value of the variable "RequestSize" for the ONUs for HLS. In other words, the allocation unit 54 updates the value of the variable "RequestSize" for the ONUs for HLS at the beginning of the DBA cycle (requested amount reception cycle) of SR-DBA.

Figure 10:
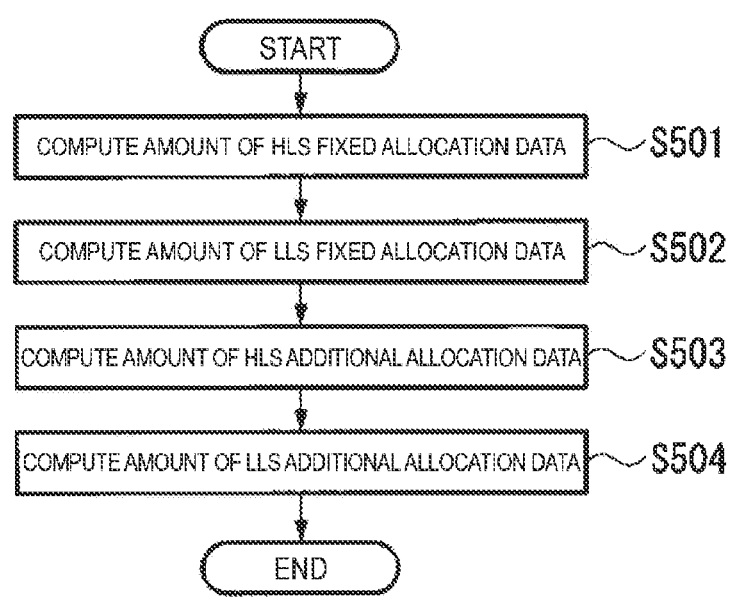
FIG. 10 is a flowchart illustrating an example of a procedure for computing the fixed amount of allocation data in uplink transmission and the additional amount of allocation data according to the first embodiment.

FIG. 10 is a flowchart illustrating an example of a procedure for computing the data amount fixed amount of allocation data and the additional amount of allocation data in uplink transmission. In a case where the allocation unit 54 reaches the remaining amount for the ONUs for LLS (the requested amount "RequestSize" for all the ONUs 6 for LLS is 0), the allocation unit 54 allocates the amount of uplink data to the ONUs 7 for HLS on the basis of the requested amount for the ONUs 7 for HLS. Furthermore, to evenly allocate the ONUs 6 for LLS with the amount of the uplink data left over after both allocations, the allocation unit 54 executes, for the amount of additional allocation data, first additional allocation processing for HLS (FIG. 13, FIG. 14, and FIG. 15) and then additional allocation processing for LLS (FIG. 16).

As described below by using FIG. 11, the allocation unit 54 allocates the ONUs for HLS with the amount of data required for notification of the requested amount for the ONUs for HLS (the amount of HLS fixed allocation data) (step S501). As described below by using FIG. 12, the allocation unit 54 allocates the ONUs for LLS with the fixed amount of allocation data (the amount of LLS fixed allocation data) for the ONUs for LLS (step S502).

As described below by using FIG. 13, FIG. 14, and FIG. 15, the allocation unit 54 adaptively and additionally allocates the amount of remaining unallocated data to the ONUs for HLS, in accordance with the requested amount related to the transmission of the uplink data from the ONUs for HLS (step S503). As described below by using FIG. 16, the allocation unit 54 adaptively and additionally allocates the amount of remaining unallocated data to the ONUs for LLS, in accordance with the requested amount related to the transmission of the uplink data from the ONUs for LLS (step S504).

Note that, in each of the flowcharts from FIGS. 10 to 16, allocations including no parity bits for error correction are illustrated for simplification of description. Each of the flowcharts from FIGS. 10 to 16 may be a flowchart of allocation including parity bits.

Figure 11:
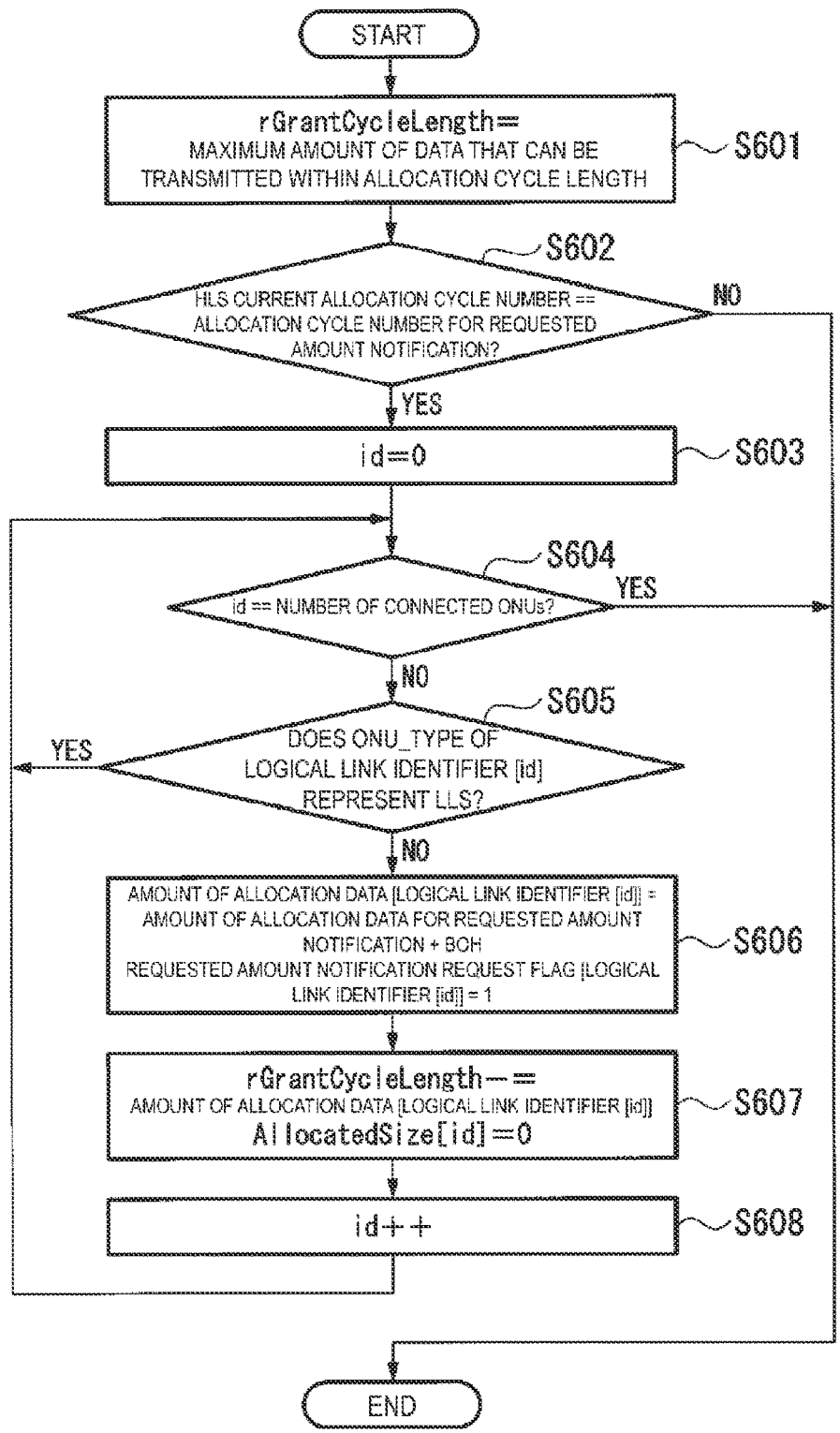
FIG. 11 is a flowchart illustrating an example of a procedure for allocating the ONUs for HLS with the amount of data required for notification of the requested amount according to the first embodiment.

FIG. 11 is a flowchart illustrating an example of a procedure for allocating the ONUs 7 for HLS with the amount of data required for notification of the requested amount. Hereinafter, the amount of data required for notification of the requested amount is designated as the "amount of allocation data for requested amount notification". Hereinafter, a value indicative of the unallocated amount of data in the amount of data that can be allocated within the allocation cycle is designated as "rGrantCycleLength". Hereinafter, burst overhead is designated as "BOH".

The allocation unit 54 substitutes the maximum amount of data that can be transmitted within the allocation cycle length into the variable "rGrantCycleLength" (step S601). The allocation unit 54 determines whether the HLS current allocation cycle number is equal to the requested amount notification allocation cycle number or not (step S602). In a case where the HLS current allocation cycle number is different from the requested amount notification allocation cycle number (step S602: NO), the allocation unit 54 terminates the processing illustrated in FIG. 11.

In a case where the HLS current allocation cycle number is equal to the requested amount notification allocation cycle number (step S602: YES), the allocation unit 54 sets the value of the variable "id" to 0 (step S603). The allocation unit 54 determines whether the value of the variable "id" is equal to the value of the variable "number of connected ONUs" (step S604). In a case where the value of the variable "id" is equal to the value of the variable "number of connected ONUs" (step S604: YES), the allocation unit 54 terminates the processing illustrated in FIG. 11.

In a case where the value of the variable "id" is different from the value of the variable "number of connected ONUs" (step S604: NO), the allocation unit 54 determines whether the set value (ONU_TYPE) of the logical link identifier [id] represents LLS (step S605). In a case where the set value (ONU_TYPE) of the logical link identifier [id] represents LLS (step S605: YES), the allocation unit 54 returns the processing to step S604. In a case where the set value of the logical link identifier [id] (ONU_TYPE) represents HLS (step S605: NO), then the allocation unit 54 substitutes the value of the variable "amount of allocation data for requested amount notification+BOH" into the value of the variable "amount of allocation data [logical link identifier [id]]". The allocation unit 54 substitutes 1 into the variable "requested amount notification request flag [logical link identifier [id]]". The requested amount notification request flag being 1 means that the ONUs are instructed to notify the requested amount (step S606).

The allocation unit 54 subtracts the value of the variable "amount of allocation data [logical link identifier [id]]" from the value of the variable "rGrantCycleLength". The allocation unit 54 sets the value of the variable "AllocatedSize [id]" to 0 (step S607). The allocation unit 54 increments the value of the variable "id" (step S608). The allocation unit 54 returns the processing back to step S604.

Figure 12:
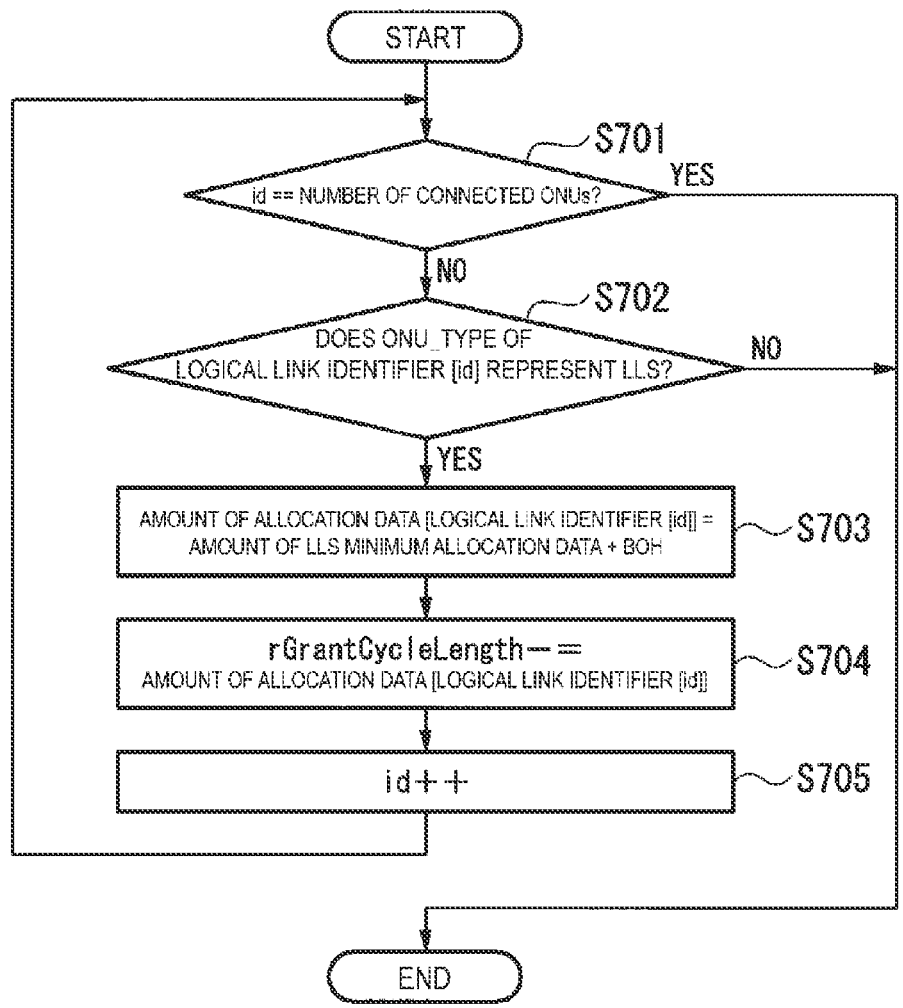
FIG. 12 is a flowchart illustrating an example of a procedure for allocating a fixed amount of data to the ONUs for LLS according to the first embodiment.

FIG. 12 is a flowchart illustrating an example of a procedure for allocating a fixed amount of data to the ONUs 6 for LLS. Regardless of the value of the requested amount "RequestSize", the amount of data allocated to the ONUs for LLS per allocation cycle is hereinafter designated as the "amount of LLS minimum allocation data".

The allocation unit 54 determines whether the value of the variable "id" is equal to the value of the variable "number of connected ONUs" (step S701). In a case where the value of the variable "id" is equal to the value of the variable "number of connected ONUs" (step S701: YES), the allocation unit 54 terminates the processing illustrated in FIG. 12. In a case where the value of the variable "id" is different from the value of the variable "number of connected ONUs" (step S701: NO), the allocation unit 54 determines whether the ONU_TYPE of the logical link identifier [id] represents LLS or not (step S702). In a case where the ONU_TYPE of the logical link identifier [id] represents HLS (step S702: NO), the allocation unit 54 terminates the processing illustrated in FIG. 12.

In a case where the ONU_TYPE of the logical link identifier [id] represents LLS (step S702: YES), the allocation unit 54 substitutes the value of the variable "amount of LLS minimum allocation data+BOH" into the value of the variable "amount of allocation data [logical link identifier [id]]" (step S703). The allocation unit 54 subtracts the value of the variable "amount of allocation data [logical link identifier [id]] from the value of the variable "rGrantCycleLength" (step S704). The allocation unit 54 increments the value of the variable "id" (step S705). The allocation unit 54 returns the processing back to step S701.

Figure 13:
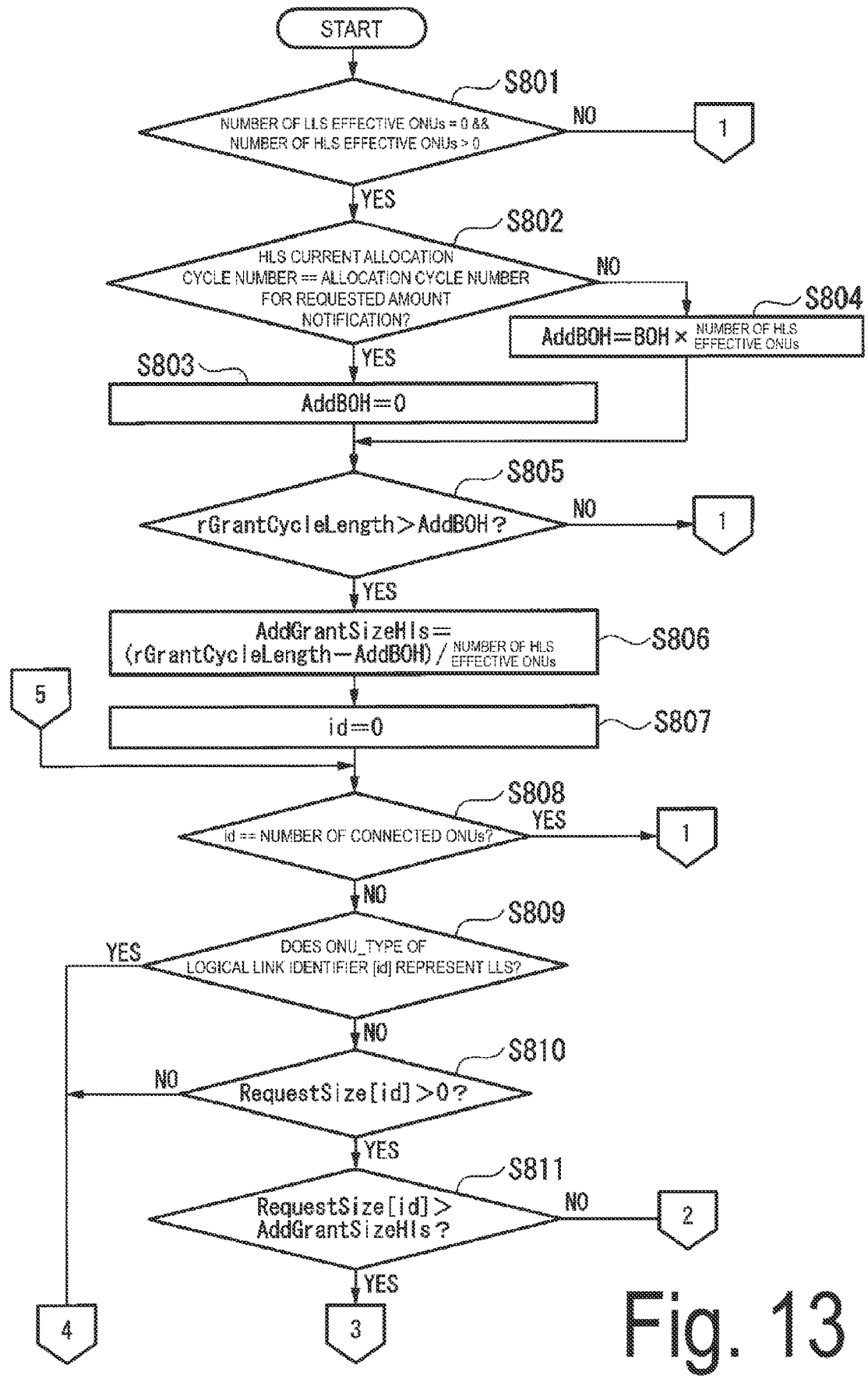
FIG. 13 is a first portion of a flowchart illustrating an example of a procedure for allocating an additional amount of data to the ONUs for HLS according to the first embodiment.

FIG. 13 is a first portion of a flowchart illustrating an example of a procedure for allocating an additional amount of data to the ONUs 7 for HLS. In a case where, in the computation of the fixed amount of allocation data (steps S501 and S502 in FIG. 10), burst overhead is already imparted as the amount of allocation data, the allocation unit 54 computes the unallocated amount of burst overhead "AddBOH" to prevent burst overhead from being additionally imparted as the amount of allocation data.

Figure 14:
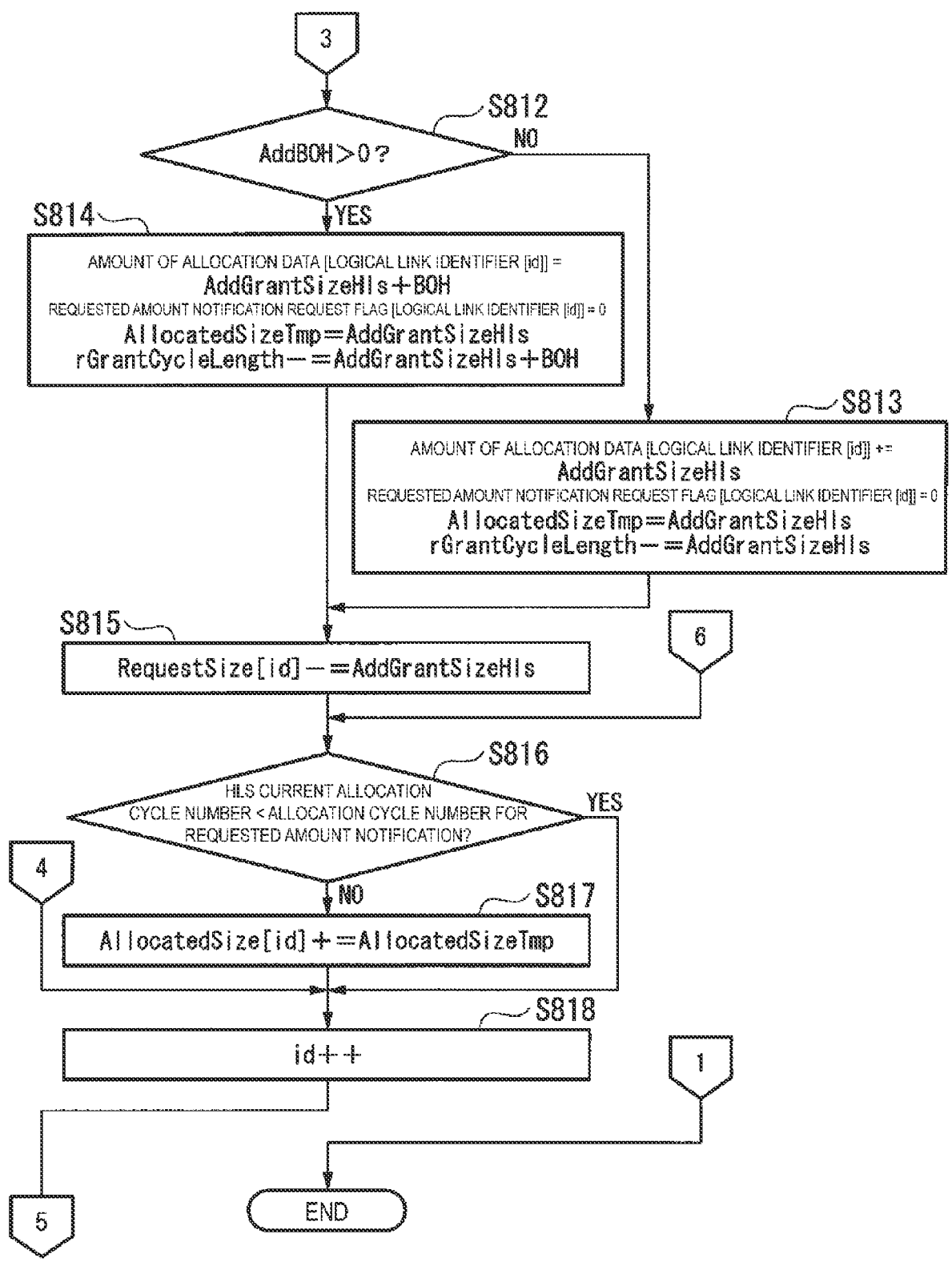
FIG. 14 is a second portion of the flowchart illustrating the example of the procedure for allocating the additional amount of data to the ONUs for HLS according to the first embodiment.
Figure 15:
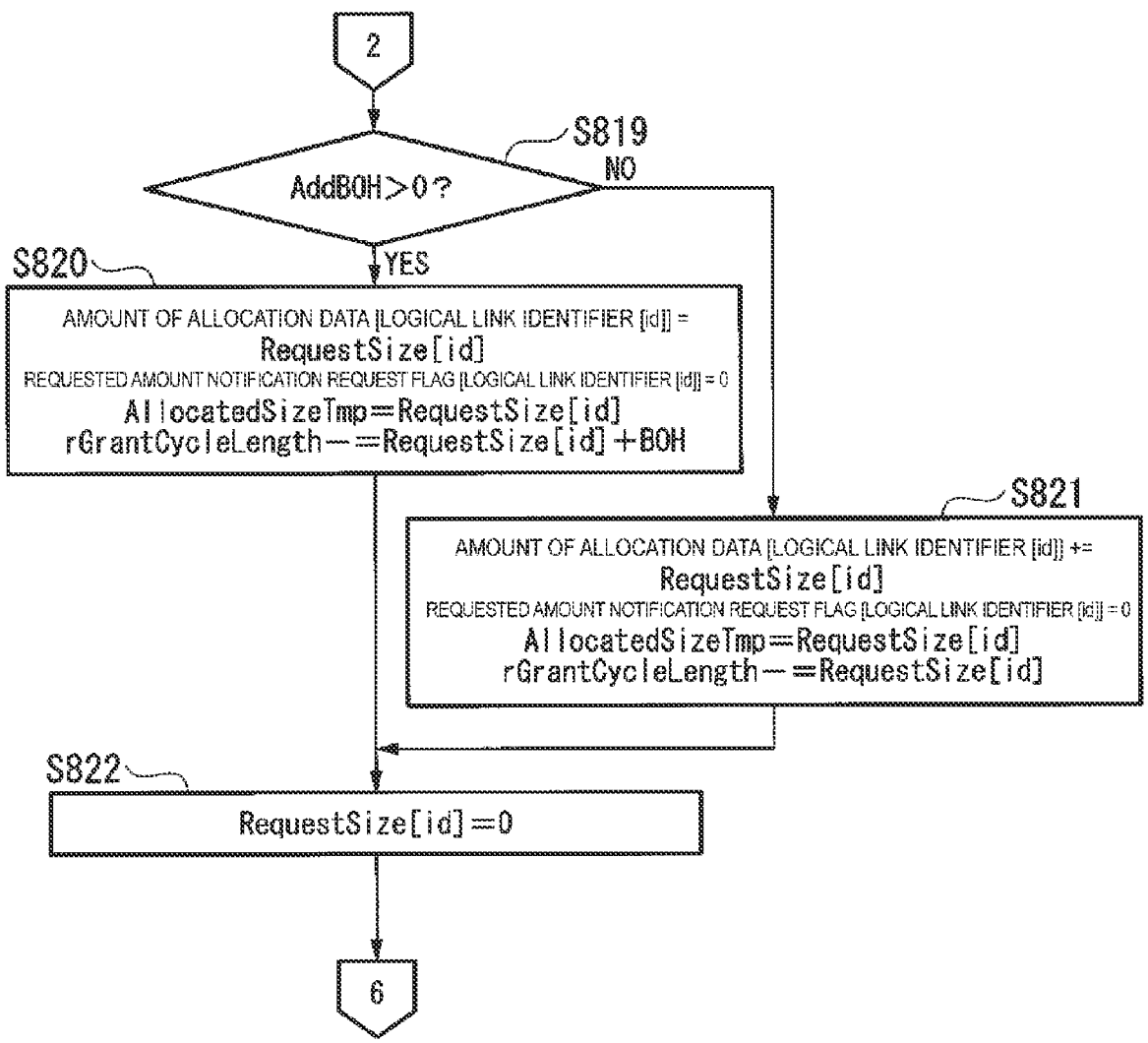
FIG. 15 is a third portion of the flowchart illustrating the example of the procedure for allocating the additional amount of data to the ONUs for HLS according to the first embodiment.
Figure 16:
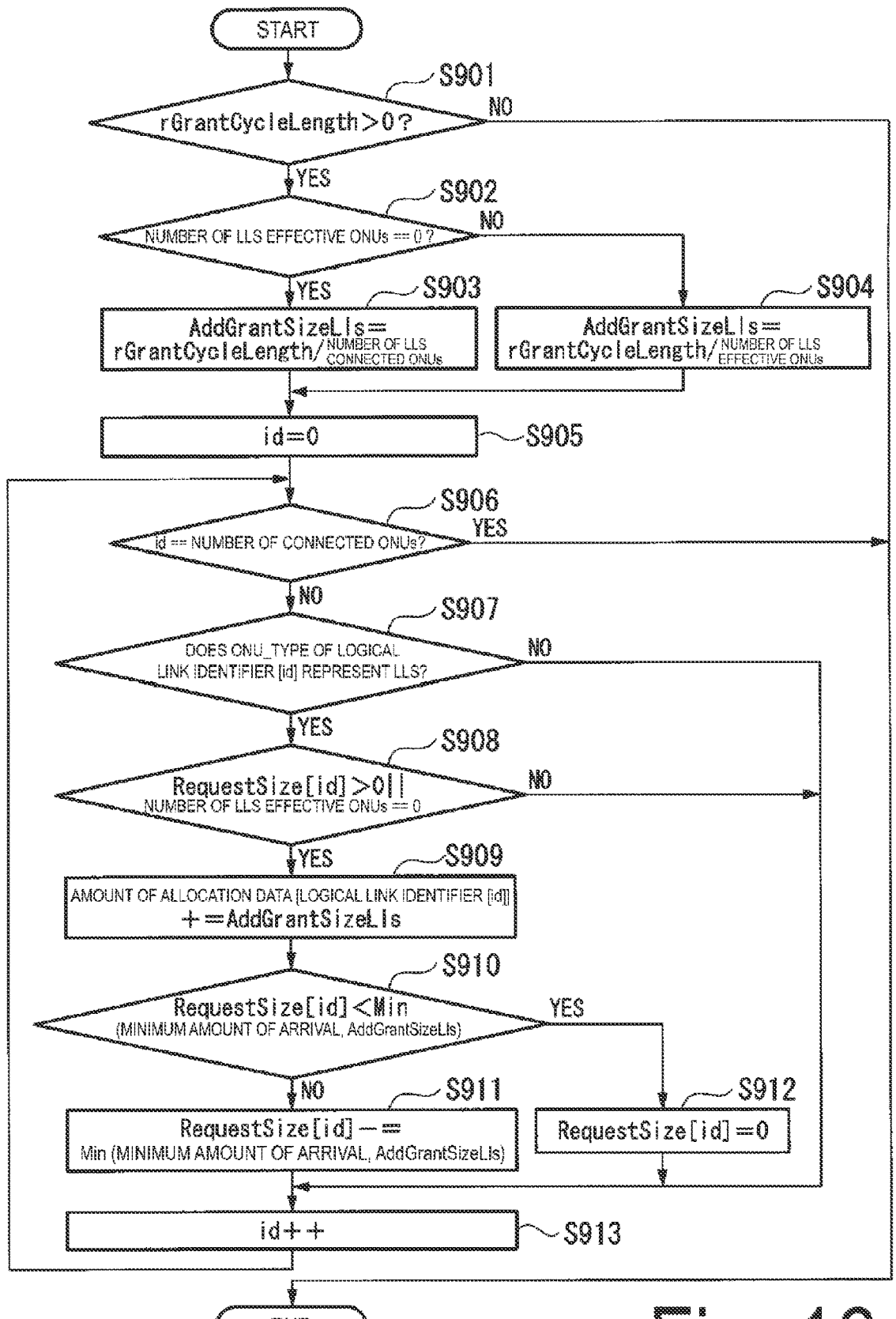
FIG. 16 is a diagram illustrating an example of a procedure for allocating the additional amount of data to the ONUs for LLS according to the first embodiment.

In the additional allocation processing in FIGS. 13, FIG. 14, and FIG. 15, the allocation unit 54 attempts to avoid allocating a requested amount equal to or greater than the variable "RequestSize". In a case where the requested amount of allocation is smaller than the variable "RequestSize", the allocation unit 54 subtracts the allocated amount of uplink data (the requested amount) from the variable "RequestSize" and carries over the amount of uplink data resulting from the subtraction to the next allocation cycle.

The allocation unit 54 determines whether the value of the variable "number of LLS effective ONUs" is 0 and the value of the variable "number of HLS effective ONUs" is greater than 0 or not (step S801). In a case where the value of the variable "number of LLS effective ONUs" is 0 and the value of the variable "number of HLS effective ONUs" is greater than 0 (step S801: YES), the allocation unit 54 determines whether the value of the variable "HLS current allocation cycle number" is equal to the value of the variable "allocation cycle number for requested amount notification" (step S802).

In a case where the value of the variable "HLS current allocation cycle number" is equal to the value of the variable "allocation cycle number for requested amount notification" (step S802: YES), the allocation unit 54 sets the value of the variable "AddBOH" for the unallocated amount of burst overhead to 0 (step S803). The allocation unit 54 advances the processing to step S805.

In a case where the value of the variable "HLS current allocation cycle number" is different from the value of the variable "allocation cycle number for requested amount notification" (step S802: NO), then the allocation unit 54 sets the value of the variable "AddBOH" for the unallocated amount of burst overhead to the value of the variable "BOH×number of HLS effective ONUs" (step S804). The allocation unit 54 advances the processing to step S805.

The allocation unit 54 determines whether the value of the variable "rGrantCycleLength" is greater than the value of the variable "AddBOH" or not (step S805). In a case where the value of the variable "rGrantCycleLength" is greater than the value of the variable "AddBOH" (step S805: YES), the allocation unit 54 substitutes the result of the "(rGrantCycleLength−AddBOH)/number of HLS effective ONUs" into the variable "AddGrantSizeHls" (step S806). The allocation unit 54 sets the value of the variable "id" to 0 (step S807).

The allocation unit 54 determines whether the value of the variable "id" is equal to the value of the variable "number of connected ONUs" (step S808). In a case where the value of the variable "id" is different from the value of the variable "number of connected ONUs" (step S808: NO), the allocation unit 54 determines whether the ONU_TYPE of the logical link identifier [id] represents LLS or not (step S809). In a case where the ONU_TYPE of the logical link identifier [id] represents HLS (step S809: NO), the allocation unit 54 determines whether the value of the variable "RequestSize[id]" is greater than 0 (step S810). In a case where the value of the variable "RequestSize[id]" is greater than 0 (step S810: YES), the allocation unit 54 determines whether the value of the variable "RequestSize[id]" is greater than the value of the variable "AddGrantSizeHls" (step S811).

FIG. 14 is a second portion of the flowchart illustrating the example of the procedure for allocating the additional amount of data to the ONUs 7 for HLS. The allocation unit 54 determines whether the value of the variable "AddBOH" is greater than 0 (step S812). In a case where the value of the variable "AddBOH" is 0 or smaller (step S812: NO), the allocation unit 54 adds the value of the variable "AddGrantSizeHls" to the value of the variable "amount of allocation data [logical link identifier [id]]". The allocation unit 54 substitutes 0 into the value of the variable "requested amount notification request flag [logical link identifier [id]]". The allocation unit 54 substitutes the value of the variable "AddGrantSizeHls" into the value of the variable "AllocatedSizeTmp". The allocation unit 54 subtracts the value of the variable "AddGrantSizeHls" from the value of the variable "rGrantCycleLength" (step S813). The allocation unit 54 advances the processing to step S815.

In a case where the value of the variable "AddBOH" is greater than 0 (step S812: YES), the allocation unit 54 substitutes the value of the variable "AddGrantSizeHls+BOH" into the value of the variable "amount of allocation data [logical link identifier [id]]". The allocation unit 54 substitutes 0 into the value of the variable "requested amount notification request flag [logical link identifier [id]]". The allocation unit 54 substitutes the value of the variable "AddGrantSizeHls" into the value of the variable "AllocatedSizeTmp". The allocation unit 54 subtracts the value of the variable "AddGrantSizeHls+BOH" from the value of the variable "rGrantCycleLength" (step S814).

The allocation unit 54 subtracts the value of the variable "AddGrantSizeHls" from the value of the variable "RequestSize[id]" (step S815). The allocation unit 54 determines whether the value of the variable "HLS current allocation cycle number" is smaller than the value of the variable "allocation cycle number for requested amount notification" (step S816). In a case where the value of the variable "HLS current allocation cycle number" is smaller than the value of the variable "allocation cycle number for requested amount notification" (step S816: YES), the allocation unit 54 advances the processing to step S818.

In a case where the value of the variable "HLS current allocation cycle number" is equal to or greater than the value of the variable "allocation cycle number for requested amount notification" (step S816: NO), the allocation unit 54 adds the value of the variable "AllocatedSizeTmp to the value of the variable "AllocatedSize[id]" (step S817). The allocation unit 54 increments the value of the variable "id" (step S818).

FIG. 15 is a third portion of the flowchart illustrating the example of the procedure for allocating the additional amount of data to the ONUs 7 for HLS. The allocation unit 54 determines whether the value of the variable "AddBOH" is greater than 0 (step S819). In a case where the value of the variable "AddBOH" is greater than 0 (step S819: YES), the allocation unit 54 substitutes the value of the variable "RequestSize[id]" into the value of the variable "amount of allocation data [logical link identifier [id]]". The allocation unit 54 substitutes 0 into the value of the variable "requested amount notification request flag [logical link identifier [id]]". The allocation unit 54 substitutes the value of the variable "RequestSize[id]" into the value of the variable "AllocatedSizeTmp". The allocation unit 54 subtracts the value of the variable "RequestSize[id]+BOH" from the value of the variable "rGrantCycleLength" (step S820).

In a case where the value of the variable "AddBOH" is 0 or smaller (step S819: NO), the allocation unit 54 adds the value of the variable "RequestSize[id]" to the value of the variable "amount of allocation data [logical link identifier [id]]". The allocation unit 54 substitutes 0 into the value of the variable "requested amount notification request flag [logical link identifier [id]]". The allocation unit 54 substitutes the value of the variable "RequestSize[id]" into the value of the variable "AllocatedSizeTmp". The allocation unit 54 subtracts the value of the variable "RequestSize[id]" from the value of the variable "rGrantCycleLength" (step S821). The allocation unit 54 substitutes 0 into the value of the variable "RequestSize[id]" (step S822).

FIG. 16 is a diagram illustrating an example of a procedure for allocating an additional amount of data to the ONUs 6 for LLS.

In a case where there is an unallocated amount of data and the number of LLS effective ONUs is not 0, the allocation unit 54 evenly distributes the unallocated amount of data among only the ONUs 6 for LLS where the variable "RequestSize," representing the requested amount, is not 0. In a case where the number of LLS effective ONUs is 0, the allocation unit 54 evenly distributes the unallocated amount of data among all of the ONUs for LLS.

The allocation unit 54 determines whether the value of the variable "rGrantCycleLength" is greater than 0 (step S901). In a case where the value of the variable "rGrantCycleLength" is 0 or smaller (step S901: NO), the allocation unit 54 terminates the processing illustrated in FIG. 16. In a case where the value of the variable "rGrantCycleLength" is greater than 0 (step S901: YES), the allocation unit 54 determines whether the value of the variable "number of LLS effective ONUs" is 0 (step S902).

In a case where the value of the variable "number of LLS effective ONUs" is 0 (step S902: YES), the allocation unit 54 substitutes the result of the "rGrantCycleLength/number of LLS connected ONUs" into the variable "AddGrantSizeHls" (step S903). In a case where the value of the variable "number of LLS effective ONUs" is not 0 (step S902: NO), the allocation unit 54 substitutes the result of the "rGrantCycleLength/number of LLS effective ONUs" into the variable "AddGrantSizeHls" (step S904). The allocation unit 54 sets the value of the variable "id" to 0 (step S905).

The allocation unit 54 determines whether the value of the variable "id" is equal to the value of the variable "number of connected ONUs" (step S906). In a case where the value of the variable "id" is equal to the value of the variable "number of connected ONUs" (step S906: YES), then the allocation unit 54 terminates the processing illustrated in FIG. 16. In a case where the value of the variable "id" is different from the value of the variable "number of connected ONUs" (step S906: NO), the allocation unit 54 determines whether the ONU_TYPE of the logical link identifier [id] represents LLS or not (step S907). In a case where the ONU_TYPE of the logical link identifier [id] represents HLS (step S907: NO), the allocation unit 54 advances the processing to step S913.

In a case where the ONU_TYPE of the logical link identifier [id] represents LLS (step S907: YES), the allocation unit 54 determines whether the value of the variable "RequestSize[id]" is greater than 0 or not or whether the value of the variable "number of LLS effective ONUs" is 0 or not (step S908). In a case where the value of the variable "RequestSize[id]" is 0 or smaller and the value of the variable "number of LLS effective ONUs" is not 0 (step S908: NO), the allocation unit 54 advances the processing to step S913.

In a case where the value of the variable "RequestSize[id]" is greater than 0 or the value of the variable "number of LLS effective ONUs" is 0 (step S908: YES), the allocation unit 54 adds the value of the variable "AddGrantSizeLls" to the value of the variable "amount of allocation data [logical link identifier [id]]" (step S909).

The allocation unit 54 determines whether the value of the variable "RequestSize[id]" is smaller than the value of the smaller of the minimum amount of arrival that is predetermined for the amount of uplink data from the ONU 6 for LLS and the value of the variable "AddGrantSizeLls" (step S910). In a case where the value of the variable "RequestSize[id]" is equal to or greater than the value of the smaller of the minimum amount of arrival and the value of the variable "AddGrantSizeLls" (step S910: NO), the allocation unit 54 subtracts, from the value of the variable "RequestSize[id], the value of the smaller of the minimum amount of arrival and the value of the variable "AddGrantSizeLls" (step S911).

In a case where the value of the variable "RequestSize[id] is smaller than the value of the smaller of the minimum amount of arrival and the value of the variable "AddGrantSizeLls" (step S910: YES), then the allocation unit 54 substitutes 0 into the variable "RequestSize[id]" (step S912). The allocation unit 54 increments the variable "id" (step S913). The allocation unit 54 returns the processing back to step S906.

As described above, the OLT 5 (bandwidth allocation apparatus) of the first embodiment includes the cooperative processing unit 50 (an acquirer), the requested amount reception unit 52 (a receiver), and the allocation unit 54 (an allocator). The cooperative processing unit 50 acquires scheduling information related to the transmission of the uplink data from the ONUs 6 that need to transfer the uplink data with low latency (first subscriber line termination apparatus). The requested amount reception unit 52 receives information representing the requested amount related to the transmission of the uplink data from the ONUs 7, from the ONUs 7 that do not need to transfer the uplink data with low latency (second subscriber line termination apparatus), in the requested amount reception cycle, which corresponds to a cycle equal to or longer than the maximum RTT. The allocation unit 54 allocates the bandwidth to the uplink data from the ONUs 6 on the basis of the scheduling information in the allocation amount computation cycle (allocation amount determination cycle), which is shorter than the requested amount reception cycle. The allocation unit 54 allocates the bandwidth to the uplink data from the ONUs 7 on the basis of the information representing the requested amount in the allocation amount computation cycle (the allocation amount determination cycle), which is shorter than the requested amount reception cycle.

Thus, the OLT 5 of the first embodiment can achieve both cooperative DBA and SR-DBA.

In other words, the OLT 5 of the first embodiment can operate SR-DBA and cooperative DBA on the same OLT in virtually different DBA cycles. The OLT 5 of the first embodiment can achieve, by simultaneous operation (merger) of SR-DBA and cooperative DBA, both low latency for LLS and high bandwidth utilization efficiency for HLS and FTTH.

The allocation unit 54 of the first embodiment may allocate, in the allocation for requested amount notification 102, the bandwidth for transmission of the uplink data of the information representing the requested amount. The allocation unit 54 may allocate a portion of the bandwidth remaining unallocated for the transmission of the uplink data of the information representing the requested amount, for the transmission of the uplink data from the ONUs 6 in the allocation for cooperative DBA 101. The allocation unit 54 may allocate a portion of the bandwidth remaining unallocated to the uplink data from the ONUs 6, for the transmission of the uplink data from the ONUs 7 in the allocation for SR-DBA 103. The allocation unit 54 may, for example, evenly allocate the uplink data from the ONUs 6 with a portion of the bandwidth remaining unallocated for the transmission of the uplink data from the ONUs 7.

In the first embodiment, each of the ONUs 7 is connected to the corresponding lower level apparatus 9 for HLS, but may be connected to a lower level apparatus for FTTH. In this case, the upper level apparatus 3 is similarly an apparatus for FTTH. The upper level apparatus for FTTH and the upper level apparatus for HLS may be mixed in the optical communication system 1.

Second Embodiment

The second embodiment differs from the first embodiment in that the allocation unit 54 performs allocation on the ONUs 7 for HLS within a range from a minimum amount of allocation data (hereinafter referred to as a "minimum amount of data") to a maximum amount of allocation data (hereinafter referred to as a "maximum amount of data"). In the second embodiment, differences from the first embodiment will be described.

Figure 17:
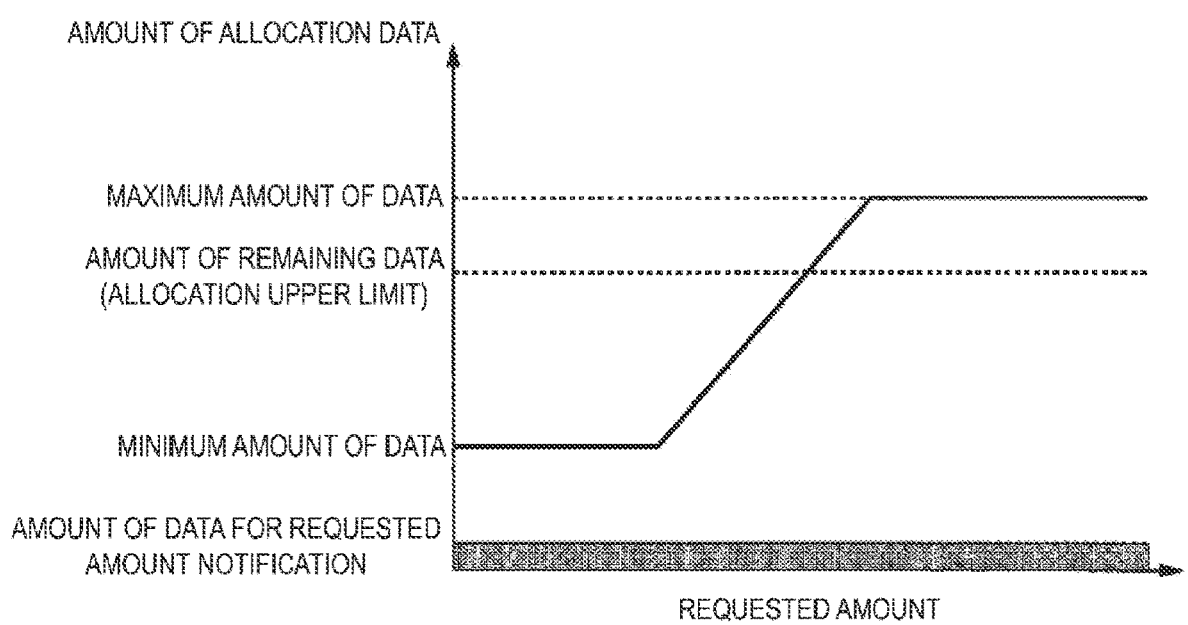
FIG. 17 is a diagram illustrating an example of a relationship between a requested amount and an allocation amount according to a second embodiment.

FIG. 17 is a diagram illustrating an example of a relationship between the requested amount and the allocation amount (the amount of allocation data). The minimum amount of data is the amount of data allocated to each of the ONUs 7 for HLS, regardless of whether the ONU 7 for HLS notifies the requested amount to the OLT 5. The maximum amount of data is the maximum amount of data that can be allocated to the ONU 7 for HLS. The minimum amount of data and the maximum amount of data are values that are predetermined for each ONU 7 for HLS by an external apparatus or the like. The upper limit (allocation upper limit) of the amount of allocation data that can be additionally allocated varies according to the amount of remaining data from the ONU 6 for LLS (bands left over due to the requested amount "RequestSize" for all the ONUs 6 for LLS being 0). In other words, the upper limit (allocation upper limit) of the amount of allocation data that can be additionally allocated varies depending on the residue of the amount of allocation data (the amount of remaining data). The maximum amount of data is valid only in a case where the amount of residual data is greater than the maximum amount of data. The minimum amount of data is valid only in a case where the amount of remaining data is greater than the minimum amount of data.

Figure 18:
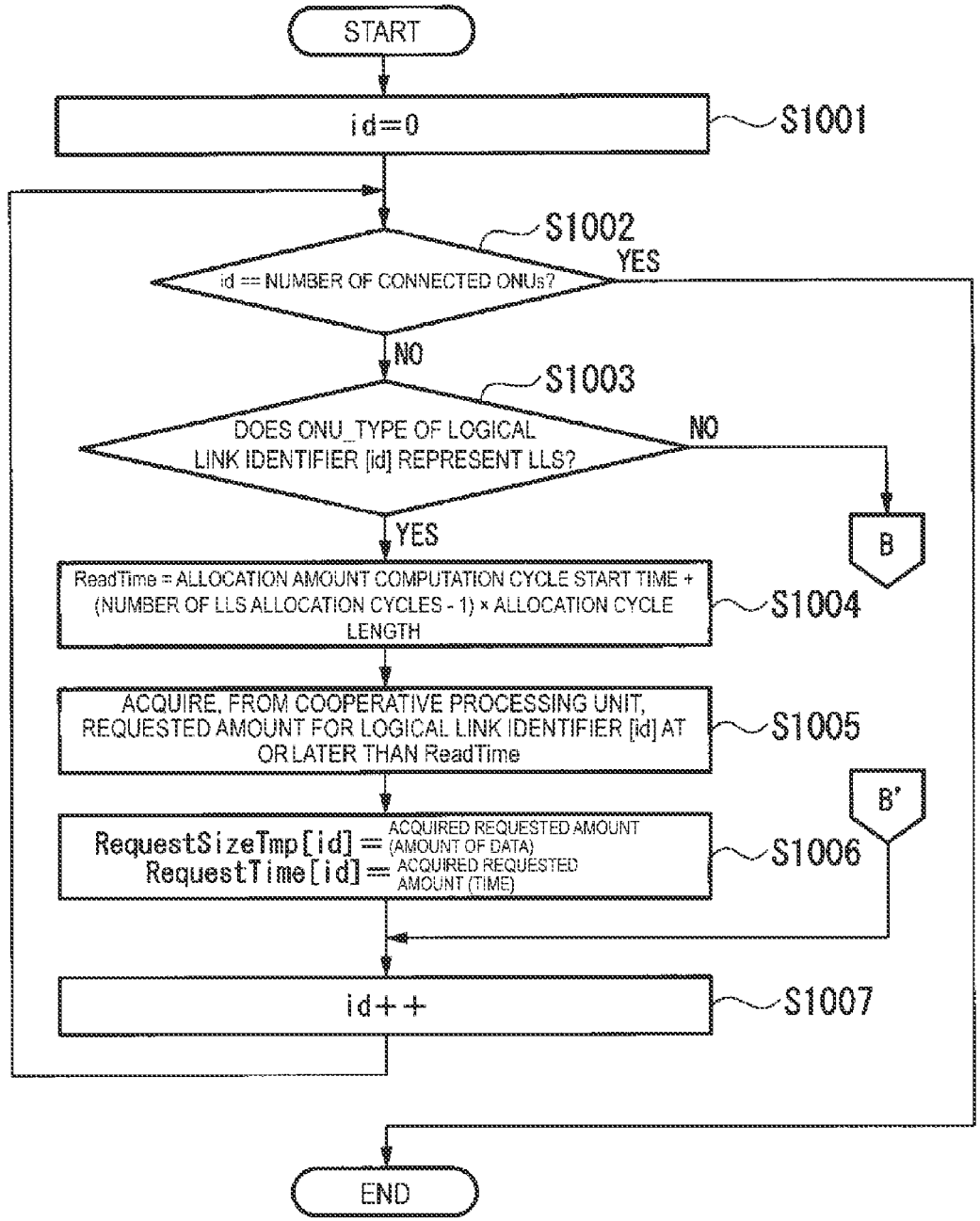
FIG. 18 is a flowchart illustrating an example of a procedure for acquiring the requested amount for the ONUs for LLS according to the second embodiment.

FIG. 18 is a flowchart illustrating an example of a procedure for acquiring the requested amount for the ONUs 6 for LLS. Operations from steps S1001 to S1007 are similar to the operations from step S201 to S207 in FIG. 6.

Figure 19:
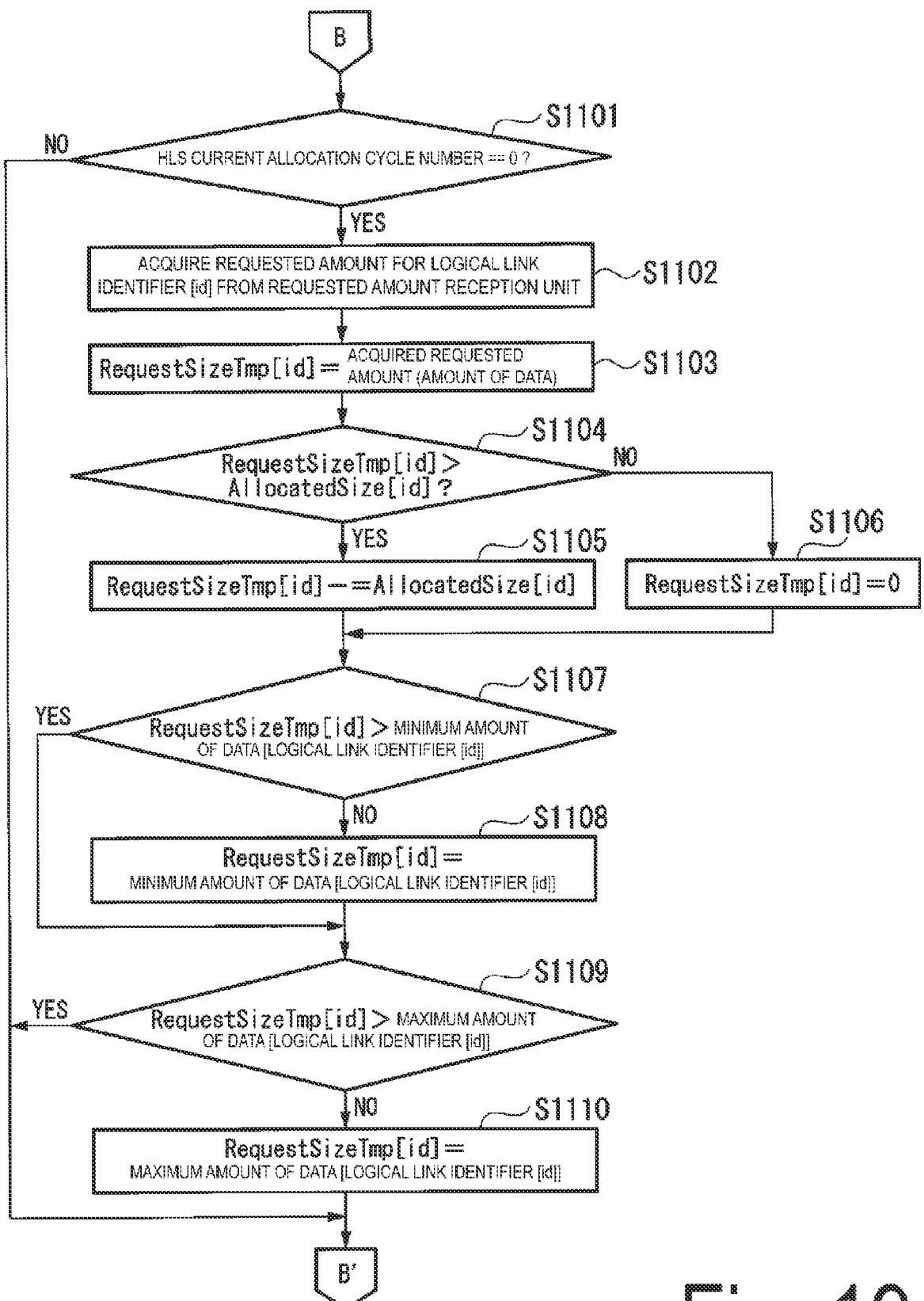
FIG. 19 is a flowchart illustrating an example of a procedure for acquiring the requested amount for the ONUs for HLS according to the second embodiment.

FIG. 19 is a flowchart illustrating an example of a procedure for acquiring the requested amount for the ONUs 7 for HLS (step S101 in FIG. 5). The allocation unit 54 determines whether the HLS current allocation cycle number is 0 or not. In other words, the allocation unit 54 determines whether the current time is the start time of the DBA cycle of SR-DBA (step S1101). In a case where the HLS current allocation cycle number is not 0 (step S1101: NO), the allocation unit 54 returns processing back to step S1007 in FIG. 18.

In a case where the HLS current allocation cycle number is 0 (step S1101: YES), the allocation unit 54 acquires the requested amount for the logical link identifier [id] from the requested amount reception unit 52 (step S1102). The allocation unit 54 substitutes the requested amount of the logical link identifier [id] (the amount of uplink data) into the variable "RequestSizeTmp[id]" (step S1103).

The allocation unit 54 determines whether the value of the variable "RequestSizeTmp[id]" is greater than the value of the variable "AllocatedSize[id]" or not (step S1104).

In a case where the value of the variable "RequestSizeTmp[id]" is greater than the value of the variable "AllocatedSize[id]" (step S1104: YES), the allocation unit 54 may subtract the value of the allocated amount of data (AllocatedSize[id]) from the value of the requested amount (RequestSize) for the logical link identifier [id] (step S1105).

In a case where the value of the variable "RequestSizeTmp[id]" is equal to smaller than the variable "AllocatedSize[id]" (step S1104: NO), the allocation unit 54 substitutes 0 into the variable "RequestSizeTmp[id]" (step S1106).

The allocation unit 54 determines whether the value of the variable "RequestSizeTmp[id]" is greater than the value of the variable "minimum amount of data [logical link identifier [id]]" or not (step S1107). In a case where the value of the variable "RequestSizeTmp[id]" is greater than the value of the variable "minimum amount of data [logical link identifier [id]]" (step S1107: YES), the allocation unit 54 advances the processing to step S1109.

In a case where the value of the variable "RequestSizeTmp[id]" is equal to or smaller than the value of the variable "minimum amount of data [logical link identifier [id]]" (step S1107: NO), the allocation unit 54 substitutes the value of the variable "minimum amount of data [logical link identifier [id]]" into the variable "RequestSizeTmp[id]" (step S1108). The allocation unit 54 determines whether the value of the variable "RequestSizeTmp[id]" is greater than the value of the variable "maximum amount of data [logical link identifier [id]]" (step S1109).

In a case where the value of the variable "RequestSizeTmp[id]" is greater than the value of the variable "maximum amount of data [logical link identifier [id]]" (step S1109: YES), the allocation unit 54 advances the processing to step S1007 illustrated in FIG. 18.

In a case where the value of the variable "RequestSizeTmp[id]" is equal to or smaller than the value of the variable "maximum data amount [logical link identifier [id]]" (step S1109: NO), the allocation unit 54 substitutes the value of the variable "maximum data amount [logical link identifier [id]]" into the variable "RequestSizeTmp[id]" (step S1110). The allocation unit 54 advances the processing to step S1007 illustrated in FIG. 18.

As described above, the allocation unit 54 of the second embodiment acquires information representing the predetermined minimum amount of data and information representing the predetermined maximum amount of data. In a case where the requested amount is smaller than the minimum amount of data, the allocation unit 54 allocates a bandwidth for the minimum amount of data for the transmission of the uplink data from the ONUs 7. In a case where the requested amount is greater than the maximum amount of data, the allocation unit 54 allocates a bandwidth for maximum amount of data for the transmission of the uplink data from the ONUs 7.

Accordingly, the OLT 5 of the second embodiment can improve the efficiency with which both cooperative DBA and SR-DBA are achieved.

Third Embodiment

The third embodiment differs from the first and second embodiments in that, in the processing for additionally allocating the uplink data from the ONUs 7 for HLS, the allocation unit 54 distributes the amount of remaining data among the ONUs 7 for HLS in accordance with weighting factors predetermined for the respective ONUs 7 for HLS. In the third embodiment, differences from the first and second embodiments will be described.

Hereinafter, the sum of the weighting factors (OnuWeight) for the ONUs for HLS for which the requested amount "RequestSize" is not 0 is designated as "OnuWeightSum". By computing the value of the variable "AddGrantSizeHls" in accordance with the weighting factor, the allocation unit 54 determines the amount of allocation data for the ONUs 7 for HLS.

Figure 20:
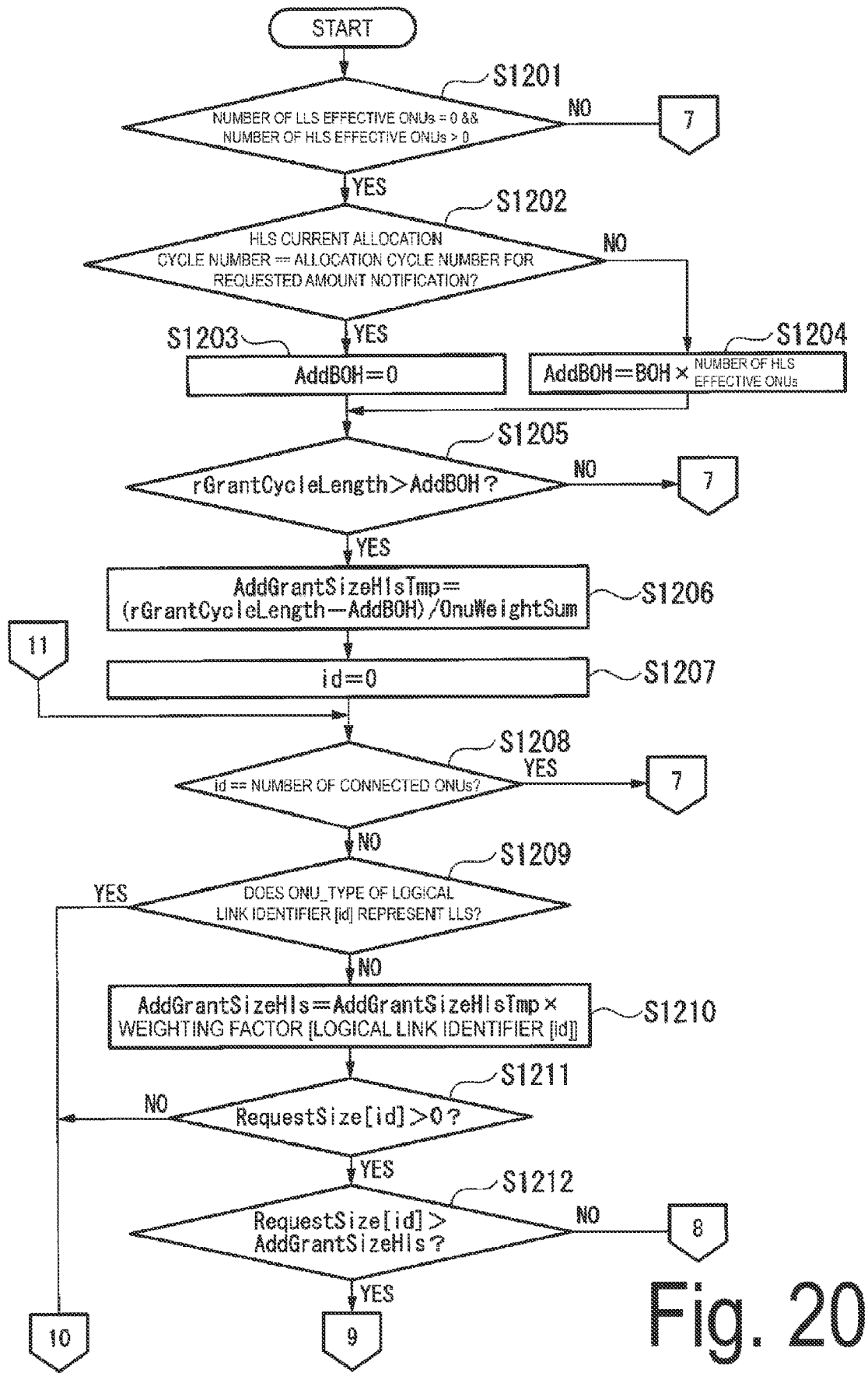
FIG. 20 is a first portion of a flowchart illustrating an example of a procedure for allocating the additional amount of data to the ONUs for HLS according to a third embodiment.

FIG. 20 is a first portion of a flowchart illustrating an example of a procedure for allocating an additional amount of data to the ONUs 7 for HLS. The allocation unit 54 determines whether the value of the variable "number of LLS effective ONUs" is 0 and the value of the variable "number of HLS effective ONUs" is greater than 0 or not (step S1201). In a case where the value of the variable "number of LLS effective ONUs" is 0 and the value of the variable "number of HLS effective ONUs" is greater than 0 (step S1201: YES), then the allocation unit 54 determines whether the value of the variable "HLS current allocation cycle number" is equal to the value of the variable "allocation cycle number for requested amount notification" or not (step S1202).

In a case where the value of the variable "HLS current allocation cycle number" is equal to the value of the variable "allocation cycle number for requested amount notification" (step S1202: YES), the allocation unit 54 sets the value of the variable "AddBOH" for the unallocated amount of burst overhead to 0 (step S1203).

The allocation unit 54 advances the processing to step S1205.

In a case where the value of the variable "HLS current allocation cycle number" is different from the value of the variable "allocation cycle number for requested amount notification" (step S1202: NO), the allocation unit 54 sets the value of the variable "AddBOH" for the unallocated amount of burst overhead equal to the value of the variable "BOH×number of HLS effective ONUs" (step S1204). The allocation unit 54 advances the processing to step S1205.

The allocation unit 54 determines whether the value of the variable "rGrantCycleLength" is greater than the value of the variable "AddBOH" (step S1205). In a case where the value of the variable "rGrantCycleLength" is greater than the value of the variable "AddBOH" (step S1205: YES), the allocation unit 54 substitutes the result of "(rGrantCycleLength-AddBOH)"/OnuWeightSum into the variable "AddGrantSizeHls" (step S1206). The allocation unit 54 sets the value of the variable "id" to 0 (step S1207).

The allocation unit 54 determines whether the value of the variable "id" is equal to the value of the variable "number of connected ONUs" (step S1208). In a case where the value of the variable "id" and the value of the variable "number of connected ONUs" are different from each other (step S1208: NO), the allocation unit 54 determines whether the ONU_TYPE of the logical link identifier [id] represents LLS or not (step S1209). In a case where the ONU_TYPE of the logical link identifier [id] represents HLS (step S1209: NO), the allocation unit 54 substitutes the result of "AddGrantSizeHlsTmp×weighting factor [logical link identifier [id]]" into the variable "AddGrantSizeHls" (step S1210).

The allocation unit 54 determines whether the value of the variable "RequestSize[id]" is greater than 0 or not (step S1211). In a case where the value of the variable "RequestSize[id]" is greater than 0 (step S1211: YES), the allocation unit 54 determines whether the value of the variable "RequestSize[id]" is greater than the value of the variable "AddGrantSizeHls" or not (step S1212).

Figure 21:
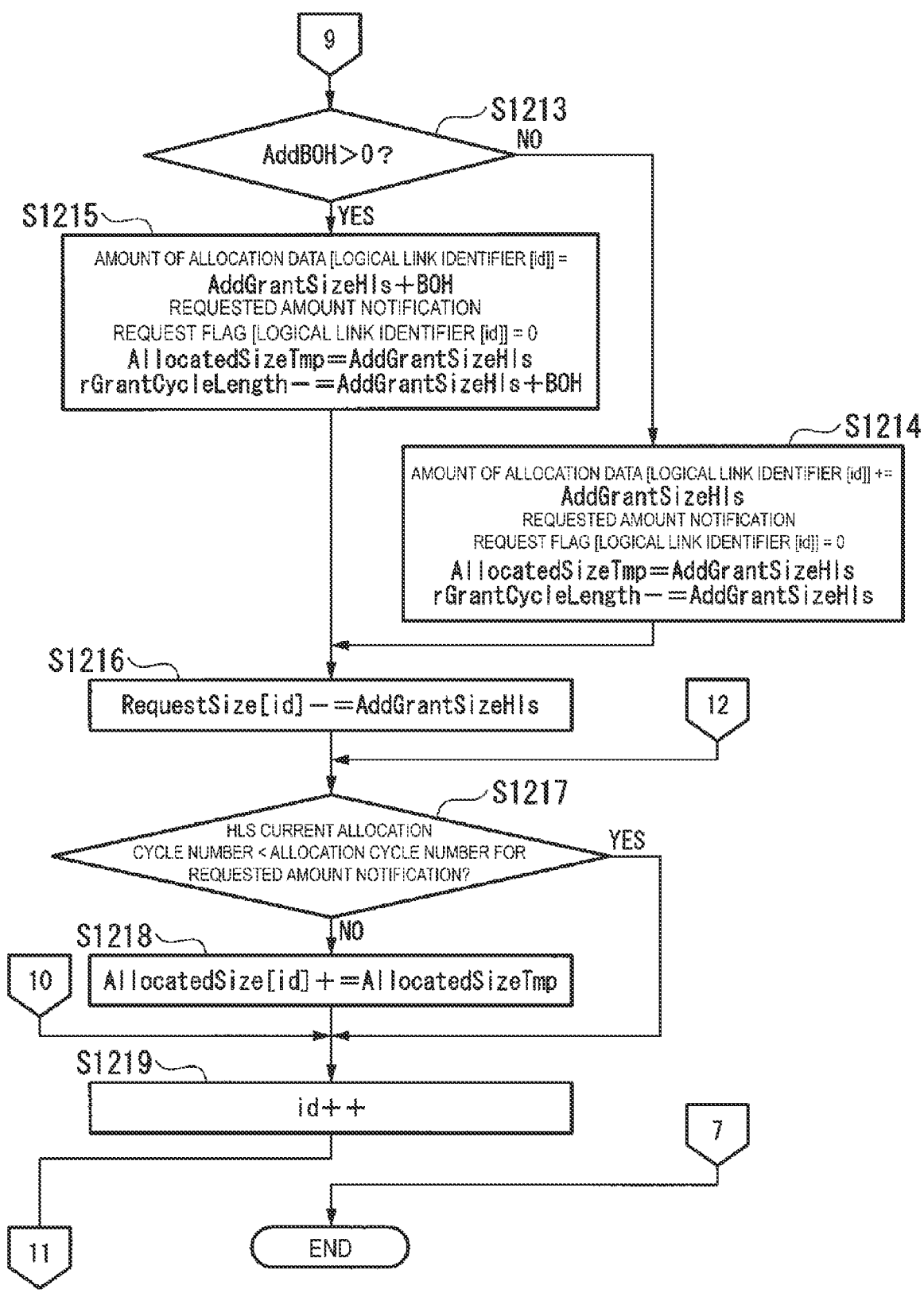
FIG. 21 is a second portion of the flowchart illustrating an example of a procedure for allocating the additional amount of data to the ONUs for HLS in the third embodiment.

FIG. 21 is a second portion of the flowchart illustrating the example of the procedure for allocating the additional amount of data to the ONUs 7 for HLS. The allocation unit 54 determines whether the value of the variable "AddBOH" is greater than 0 or not (step S1213). In a case where the value of the variable "AddBOH" is 0 or smaller (step S1213: NO), the allocation unit 54 adds the value of the variable "AddGrantSizeHls" to the value of the variable "amount of allocation data [logical link identifier [id]]". The allocation unit 54 substitutes 0 into the value of the variable "requested amount notification request flag [logical link identifier [id]]". The allocation unit 54 substitutes the value of the variable "AddGrantSizeHls" into the value of the variable "AllocatedSizeTmp". The allocation unit 54 subtracts the value of the variable "AddGrantSizeHls" from the value of the variable "rGrantCycleLength" (step S1214). The allocation unit 54 advances the processing to step S1216.

In a case where the value of the variable "AddBOH" is greater than 0 (step S1213: YES), the allocation unit 54 substitutes the value of the variable "AddGrantSizeHls+BOH" into the value of the variable "amount of allocation data [logical link identifier [id]]". The allocation unit 54 substitutes 0 into the value of the variable "requested amount notification request flag [logical link identifier [id]]". The allocation unit 54 substitutes the value of the variable "AddGrantSizeHls" into the value of the variable "AllocatedSizeTmp". The allocation unit 54 subtracts the value of the variable "AddGrantSizeHls+BOH" from the value of the variable "rGrantCycleLength" (step S1215).

The allocation unit 54 subtracts the value of the variable "AddGrantSizeHls" from the value of the variable "RequestSize[id]" (step S1216). The allocation unit 54 determines whether the value of the variable "HLS current allocation cycle number" is smaller than the value of the variable "allocation cycle number for requested amount notification" (step S1217). In a case where the value of the variable "HLS current allocation cycle number" is smaller than the value of the variable "allocation cycle number for requested amount notification" (step S1217: YES), the allocation unit 54 advances the processing to step S1219.

In a case where the value of the variable "HLS current allocation cycle number" is equal to or greater than the value of the variable "allocation cycle number for requested amount notification" (step S1217: NO), the allocation unit 54 adds the value of the variable "AllocatedSizeTmp to the value of the variable "AllocatedSize[id]" (step S1218). The allocation unit 54 increments the value of the variable "id" (step S1219).

Figure 22:
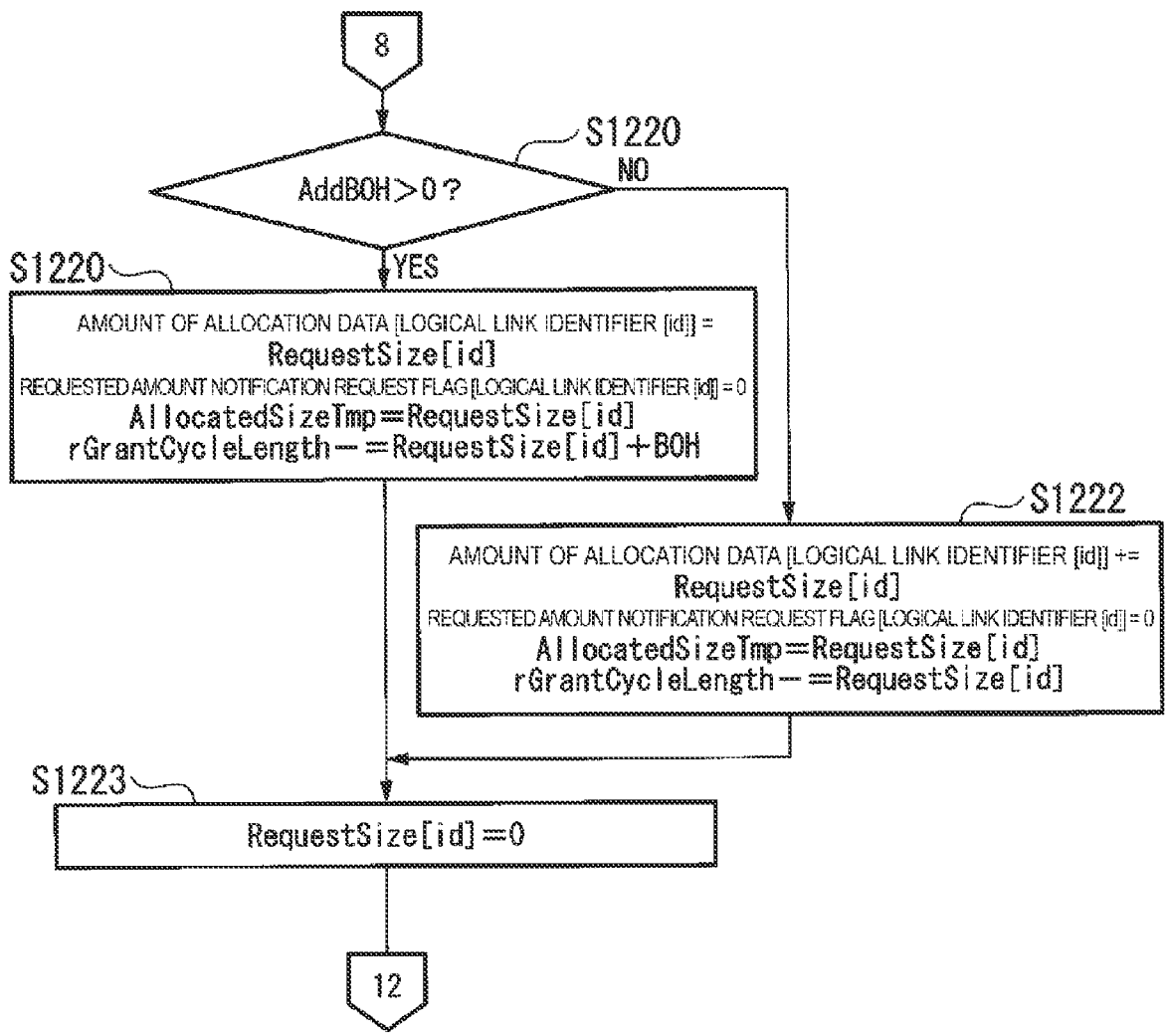
FIG. 22 is a third portion of the flowchart illustrating the example of the procedure for allocating the additional amount of data to the ONUs for HLS according to the third embodiment.

FIG. 22 is a third portion of the flowchart illustrating the example of the procedure for allocating the additional amount of data to the ONUs 7 for HLS. The allocation unit 54 determines whether the value of the variable "AddBOH" is greater than 0 or not (step S1220). In a case where the value of the variable "AddBOH" is greater than 0 (step S1220: YES), the allocation unit 54 substitutes the value of the variable "RequestSize[id]" into the value of the variable "amount of allocation data [logical link identifier [id]]". The allocation unit 54 substitutes 0 into the value of the variable "requested amount notification request flag [logical link identifier [id]]". The allocation unit 54 substitutes the value of the variable "RequestSize[id]" into the value of the variable "AllocatedSizeTmp". The allocation unit 54 subtracts the value of the variable "RequestSize[id]+BOH" from the value of the variable "rGrantCycleLength" (step S1221).

In a case where the value of the variable "AddBOH" is 0 or smaller (step S1220: NO), the allocation unit 54 adds the value of the variable "RequestSize[id]" to the value of the variable "amount of allocation data [logical link identifier [id]]". The allocation unit 54 substitutes 0 into the value of the variable "requested amount notification request flag [logical link identifier [id]]". The allocation unit 54 substitutes the value of the variable "RequestSize[id]" into the value of the variable "AllocatedSizeTmp". The allocation unit 54 subtracts the value of the variable "RequestSize[id]" from the value of the variable "rGrantCycleLength" (step S1222). The allocation unit 54 substitutes 0 into the value of the variable "RequestSize[id]" (step S1223).

Figure 23:
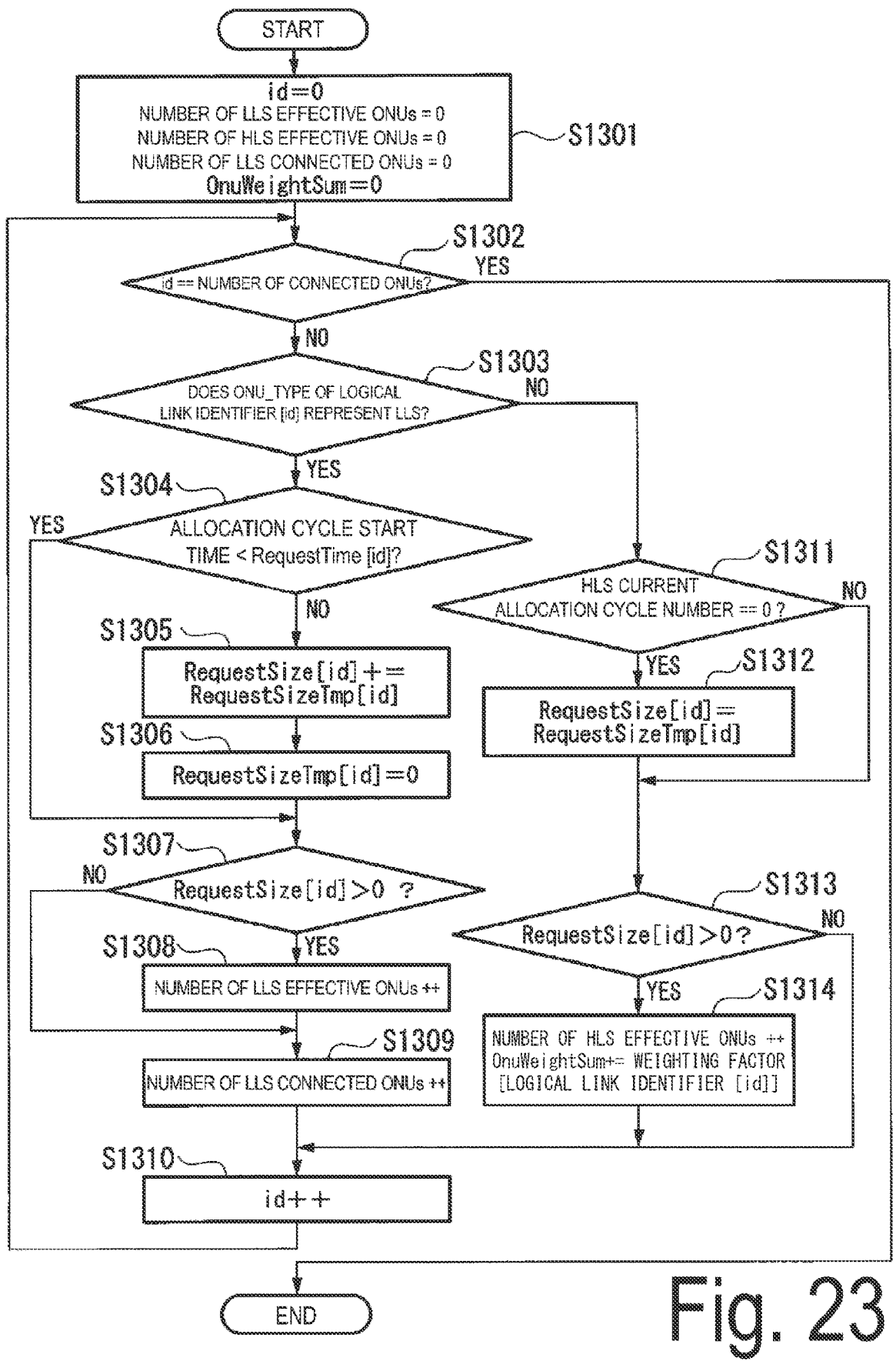
FIG. 23 is a flowchart illustrating an example of a procedure for acquiring the requested amount of data from the ONUs for HLS, the procedure including processing for measuring a weighting factor for each ONU, according to the third embodiment.

FIG. 23 is a flowchart illustrating an example of a procedure for acquiring the requested amount of data from the ONUs, the procedure including processing for measuring the weighting factor for each ONU 7 for HLS (step S102 in FIG. 5). The allocation unit 54 substitutes 0 into the variable "id", substitutes 0 into the variable "number of LLS effective ONUs", substitutes 0 into the variable "number of HLS effective ONUs", substitutes 0 into the variable "number of LLS connected ONUs", and substitutes 0 into the variable "OnuWeightSum" (step S1301).

The allocation unit 54 determines whether the variable "id" is equal to the number of connected ONUs (step S1302). In a case where the variable "id" is equal to the number of connected ONUs (step S1301: YES), then the allocation unit 54 terminates the processing illustrated in FIG. 8. In a case where the variable "id" is different from the number of connected ONUs (step S1301: NO), the allocation unit 54 determines whether the set value (ONU_TYPE) of the logical link identifier [id] represents LLS or not (step S1303).

In a case where the set value (ONU_TYPE) of the logical link identifier [id] represents LLS (step S1303: YES), the allocation unit 54 determines whether the allocation cycle start time is earlier than the time "RequestTime[id]" or not (step S1304). In a case where the allocation cycle start time is earlier than the time "RequestTime[id]" (step S1304: YES), the allocation unit 54 advances the processing to step S1307.

In a case where the allocation cycle start time is at or later than the time "RequestTime[id]" (step S1304: NO), the allocation unit 54 adds the value of the variable "RequestSizeTmp[id]" to the value of the variable "RequestSize[id]," representing the requested amount (step S1305). The allocation unit 54 sets the value of the variable "RequestSizeTmp[id]" to 0 (step S1306).

The allocation unit 54 determines whether the value of the variable "RequestSize [id]" is greater than 0 (step S1307). In a case where the value of the variable "RequestSize [id]" is 0 or smaller (step S1307: NO), the allocation unit 54 advances the processing to step S1309. In a case where the value of the variable "RequestSize [id]" is greater than 0 (step S1307: YES), the allocation unit 54 increments the value of the variable "number of LLS effective ONUs" (step S1308).

The allocation unit 54 increments the value of the variable "number of LLS connected ONUs" (step S1309). The allocation unit 54 increments the value of the variable "id" (step S1310). The allocation unit 54 returns the processing back to step S1302.

In a case where the set value (ONU_TYPE) of the logical link identifier [id] represents HLS (step S1303: NO), the allocation unit 54 determines whether the variable "HLS current allocation cycle number" is equal to 0 or not (step S1311). In a case where the variable "HLS current allocation cycle number" is different from 0 (step S1311: NO), the allocation unit 54 advances the processing to step S1313. In a case where the variable "HLS current allocation cycle number" is equal to 0 (step S1311: YES), the allocation unit 54 substitutes the value of the variable "RequestSizeTmp [id]" into the value of the variable "RequestSize[id]" (step S1312).

The allocation unit 54 determines whether the value of the variable "RequestSize[id]" is greater than 0 or not (step S1313). In a case where the value of the variable "RequestSize[id]" is 0 or smaller (step S1313: NO), the allocation unit 54 advances the processing to step S1310.

In a case where the value of the variable "RequestSize [id]" is greater than 0 (step S1307: YES), the allocation unit 54 increments the value of the variable "number of HLS effective ONUs". The allocation unit 54 adds the value of the variable "weighting factor [logical link identifier [id]] to the value of the variable "OnuWeightSum" (step S1314). The allocation unit 54 advances the processing to step S1310.

Figure 24:
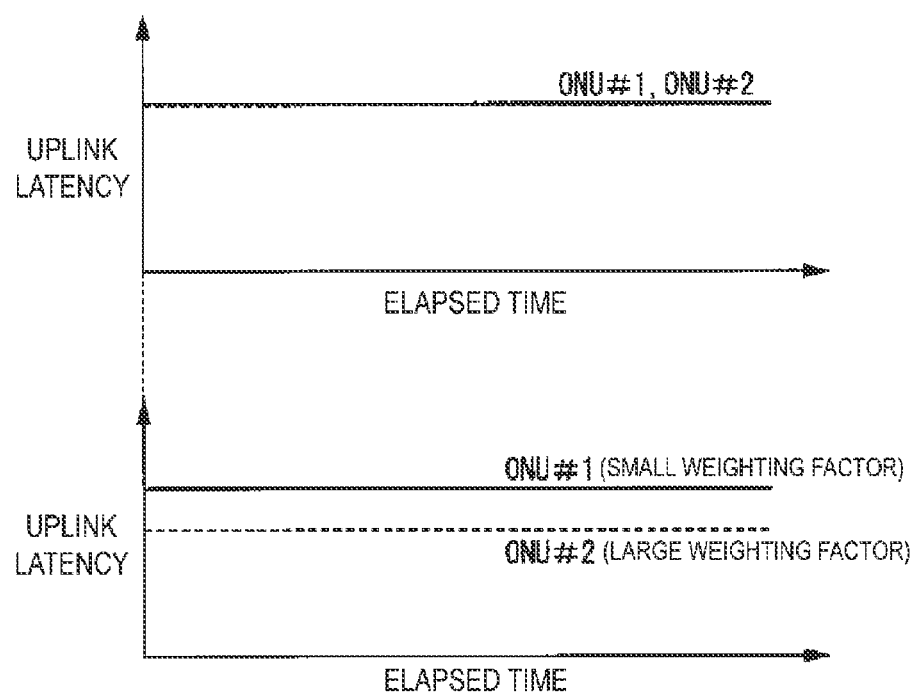
FIG. 24 is a diagram illustrating an example of a relationship between the weighting factor and uplink latency according to the third embodiment.

FIG. 24 is a diagram illustrating an example of a relationship between the weighting factor and uplink latency. In a case where the weighting factors for the ONUs 7 for HLS are the same, the allocation unit 54 allocates the amount of uplink data to the ONUs 7 for HLS under the same conditions. In a case where the weighting factors for the ONUs 7 for HLS are the same, the uplink latencies for the ONUs 7 for HLS are equivalent. In a case where the weighting factors for the ONUs 7 for HLS are different from one another, the allocation unit 54 allocates the bandwidth for the transmission of the uplink data from the ONUs 7 for HLS with priority given to the ONUs 7 for HLS having larger weighting factors. The uplink latency of uplink data for the ONU 7 for HLS having a larger weighting factor is smaller than the uplink latency of uplink data for the ONU 7 for HLS having a smaller weighting factor.

As described above, the allocation unit 54 of the third embodiment allocates the bandwidth for the transmission of the uplink data from the ONUs 7 on the basis of the weighting factor determined for each ONU 7 and the information representing the requested amount, with the bandwidth for the amount of data for the requested amount used as an upper limit.

Accordingly, the OLT 5 of the third embodiment can improve the efficiency with which both cooperative DBA and SR-DBA are achieved.

The embodiments of the present invention have been described above in detail with reference to the drawings. However, specific configurations are not limited to those embodiments, and include any design or the like within the scope not departing from the gist of the present invention.

The OLTs, ONUs, upper level apparatus, and lower level apparatus according to the above-described embodiments may be implemented by computers. In such a case, the embodiments of the present invention may be implemented by recording a program for implementing the corresponding functions in a computer-readable recording medium, and causing a computer system to read and execute the program recorded in the recording medium. Note that the "computer system" as used herein includes an OS and hardware such as a peripheral apparatus. The "computer-readable recording medium" refers to a portable medium such as a flexible disk, a magneto-optical disk, a ROM, and a CD-ROM, and a storage apparatus such as a hard disk installed in a computer system. Furthermore, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Furthermore, the above program may be a program for implementing a part of the above-mentioned functions. The above program may be a program capable of implementing the above-mentioned functions in combination with another program already recorded in a computer system. The above program may be a program to be implemented with the use of a programmable logic apparatus such as a field programmable gate array (FPGA).

INDUSTRIAL APPLICABILITY

The present invention is applicable to an optical communication system.

| Reference Signs List | |
| --- | --- |
| 1 | Optical communication system |
| 2 | Upper level apparatus |
| 3 | Upper level apparatus |
| 4 | L2SW |
| 5 | OLT |
| 6 | ONU |
| 7 | ONU |
| 8 | Lower level apparatus |
| 9 | Lower level apparatus |
| 50 | Cooperative processing unit |
| 51 | Communication unit |

| | Reference Signs List |
|---|---|
| 52 | Requested amount reception unit |
| 53 | ONU management unit |
| 54 | Allocation unit |
| 100 | Requested amount reception |
| 101 | Allocation for cooperative DBA |
| 102 | Allocation for requested amount notification |
| 103 | Allocation for SR-DBA |

The invention claimed is:

1. A bandwidth allocation apparatus comprising:
a memory; and
a processor connected to the memory, the processor being configured to:
acquire scheduling information related to transmission of uplink data from a first subscriber line termination apparatus corresponding to a subscriber line termination apparatus needing to transfer uplink data with low latency;
receive, from second subscriber line termination apparatus corresponding to a subscriber line termination apparatus not needing to transfer uplink data with low latency, information representing a requested amount related to transmission of uplink data from the second subscriber line termination apparatus, in a requested amount reception cycle corresponding to a cycle equal to or longer than a predetermined maximum round-trip time; and
allocate, in an allocation amount determination cycle shorter than the requested amount reception cycle, a first bandwidth to the uplink data from the first subscriber line termination apparatus on a basis of the scheduling information; and
allocate, in the allocation amount determination cycle, a second bandwidth to the uplink data from the second subscriber line termination apparatus on a basis of the information representing the requested amount.

2. The bandwidth allocation apparatus according to claim 1, wherein the processor is configured to allocate a third bandwidth for transmission of information representing the requested amount,
allocate, for transmission of the uplink data from the first subscriber line termination apparatus, a portion of a fourth bandwidth remaining unallocated for transmission of the information representing the requested amount,
allocate, for transmission of the uplink data from the second subscriber line termination apparatus, a portion of a fifth bandwidth remaining unallocated for transmission of the uplink data from the first subscriber line termination apparatus, and
allocate, for transmission of the uplink data from the first subscriber line termination apparatus, a portion of a sixth bandwidth remaining unallocated for transmission of the uplink data from the second subscriber line termination apparatus.

3. The bandwidth allocation apparatus according to claim 1, wherein the processor is configured to
acquire information representing a predetermined minimum amount of data and information representing a predetermined maximum amount of data,
in a case where the requested amount is smaller than the minimum amount of data, allocate a third bandwidth for the minimum amount of data for transmission of the uplink data from the second subscriber line termination apparatus, and
in a case where the requested amount is larger than the maximum amount of data, allocate a fourth bandwidth for the maximum amount of data for transmission of the uplink data from the second subscriber line termination apparatus.

4. The bandwidth allocation apparatus according to claim 1, wherein the processor is configured to allocate, on a basis of weighting factors defined for the respective second subscriber line termination apparatus and the information representing the requested amount, a third bandwidth for transmission of the uplink data from the second subscriber line termination apparatus with a fourth bandwidth for an amount of data for the requested amount used as an upper limitation.

5. A bandwidth allocation method performed by a bandwidth allocation apparatus, the bandwidth allocation method comprising:
acquiring scheduling information related to transmission of uplink data from a first subscriber line termination apparatus corresponding to a subscriber line termination apparatus needing to transfer uplink data with low latency;
receiving, from second subscriber line termination apparatus corresponding to a subscriber line termination apparatus not needing to transfer uplink data with low latency, information representing a requested amount related to transmission of the uplink data from the second subscriber line termination apparatus, in a requested amount reception cycle corresponding to a cycle equal to or longer than a predetermined maximum round-trip time;
allocating, in an allocation amount determination cycle shorter than the requested amount reception cycle, a first bandwidth to the uplink data from the first subscriber line termination apparatus on a basis of the scheduling information; and
allocating, in the allocation amount determination cycle, a second bandwidth to the uplink data from the second subscriber line termination apparatus on a basis of the information representing the requested amount.

6. The bandwidth allocation method according to claim 5, wherein the bandwidth allocation method further comprises:
allocating a third bandwidth for transmission of information representing the requested amount;
allocating, for transmission of the uplink data from the first subscriber line termination apparatus, a portion of a fourth bandwidth remaining unallocated for transmission of the information representing the requested amount;
allocating, for transmission of the uplink data from the second subscriber line termination apparatus, a portion of a fifth bandwidth remaining unallocated for transmission of the uplink data from the first subscriber line termination apparatus; and
allocating, for transmission of the uplink data from the first subscriber line termination apparatus, a portion of a sixth bandwidth remaining unallocated for transmission of the uplink data from the second subscriber line termination apparatus.

7. The bandwidth allocation method according to claim 5, wherein the bandwidth allocation method further comprises:
acquiring information representing a predetermined minimum amount of data and information representing a predetermined maximum amount of data;

in a case where the requested amount is smaller than the minimum amount of data, allocating a third bandwidth for the minimum amount of data for transmission of the uplink data from the second subscriber line termination apparatus; and in a case where the requested amount is larger than the maximum amount of data, allocating a fourth bandwidth for the maximum amount of data for transmission of the uplink data from the second subscriber line termination apparatus.

8. A non-transitory computer-readable storage medium that stores a bandwidth allocation program for causing a computer to:

acquire scheduling information related to transmission of uplink data from a first subscriber line termination apparatus corresponding to a subscriber line termination apparatus needing to transfer uplink data with low latency;

receive, from second subscriber line termination apparatus corresponding to a subscriber line termination apparatus not needing to transfer uplink data with low latency, information representing a requested amount related to transmission of uplink data from the second subscriber line termination apparatus, in a requested amount reception cycle corresponding to a cycle equal to or longer than a predetermined maximum round-trip time;

allocate, in an allocation amount determination cycle shorter than the requested amount reception cycle, a first bandwidth to the uplink data from the first subscriber line termination apparatus on a basis of the scheduling information; and allocate, in the allocation amount determination cycle, a second bandwidth to the uplink data from the second subscriber line termination apparatus on a basis of the information representing the requested amount.

\* \* \* \* \*